United States Patent [19]
Krause et al.

[11] Patent Number: 5,877,812
[45] Date of Patent: Mar. 2, 1999

[54] METHOD AND APPARATUS FOR INCREASING CHANNEL UTILIZATION FOR DIGITAL VIDEO TRANSMISSION

[75] Inventors: Edward A. Krause, El Cerrito; Adam S. Tom; Paul Shen, both of San Francisco, all of Calif.

[73] Assignee: Imedia Corporation, San Francisco, Calif.

[21] Appl. No.: 561,410

[22] Filed: Nov. 21, 1995

[51] Int. Cl.⁶ .................................................. H04N 7/12
[52] U.S. Cl. ........................ 348/385; 348/387; 370/465
[58] Field of Search ................................. 348/423, 385, 348/387, 426, 419; 370/465, 470, 471, 472; H04N 7/24, 7/30, 7/12

[56] References Cited

U.S. PATENT DOCUMENTS

| | | | |
|---|---|---|---|
| 4,455,649 | 6/1984 | Esteban et al. | 370/80 |
| 4,477,900 | 10/1984 | Gruenberg | 370/112 |
| 4,494,232 | 1/1985 | Drambrackas et al. | 370/80 |
| 5,115,309 | 5/1992 | Hang | 358/133 |
| 5,144,425 | 9/1992 | Joseph | 358/133 |
| 5,216,503 | 6/1993 | Paik et al. | 358/133 |
| 5,241,383 | 8/1993 | Chen et al. | 358/136 |
| 5,291,281 | 3/1994 | Paik et al. | 348/384 |
| 5,361,096 | 11/1994 | Ohki et al. | 348/387 |
| 5,506,844 | 4/1996 | Rao et al. | 370/84 |
| 5,550,589 | 8/1996 | Shiojiri et al. | 348/423 |
| 5,566,174 | 10/1996 | Sato et al. | 348/423 |

FOREIGN PATENT DOCUMENTS

| | | | |
|---|---|---|---|
| 63092140 | 4/1988 | European Pat. Off. | H04L 11/20 |
| 63222592 | 9/1988 | European Pat. Off. | H04N 7/13 |
| 0 382 892 | 8/1990 | European Pat. Off. | H04N 7/13 |
| 05095340 | 4/1993 | European Pat. Off. | H04J 3/22 |
| 0 562 221 A1 | 9/1993 | European Pat. Off. | H04N 5/907 |
| 0 577 329 A2 | 1/1994 | European Pat. Off. | H04N 7/13 |
| 0 625 857 A1 | 11/1994 | European Pat. Off. | H04N 7/173 |
| 0 653 885 A1 | 5/1995 | European Pat. Off. | H04N 7/173 |
| 2 289 194 | 11/1995 | United Kingdom | H04J 3/16 |
| WO 95/29559 | 11/1995 | WIPO | H04N 7/12 |

OTHER PUBLICATIONS

Haskell, Barry G., et al., "Multiplexing of Varible Rate Encoded Streams," IEEE Transations on Circuits and Systems for Video Technology vol. 4, No. 4, pp. 417–424 (Aug. 1994).

Patent Abstract of Japan, vol. 12, No. 328 (E–654), Sep. 6, 1988 & JP 63 092140 A (NTT Corp.), Apr. 22, 1988.

Patent Abstract of Japan, vol. 13, No. 16 (E–703), Jan. 13, 1989 & JP 63 222592 A (Toshiba Corp.), Sep. 16, 1988.

Patent Abstract of Japan, vol. 17, No. 444 (E–1415), Aug. 16, 1993 & JP 05 095340 A (NEC Corp.), Apr. 16, 1993.

*Primary Examiner*—Chris Grant
*Attorney, Agent, or Firm*—McCutchen, Doyle, Brown & Enersen, LLP

[57] ABSTRACT

A method and apparatus for reducing the size of data rate fluctuations that occur in forming a multiplex of a set of program streams, each program stream in said set being decodeable by a corresponding decoder, each corresponding decoder including a corresponding decoder buffer, said decoder buffers having a maximum allowable size, said method comprising varying the formation of the different program streams in said set to minimize the memory requirement of the decoder buffers. In one embodiment, for the case of the streams being segments of a program, varying includes varying the segment length. In another embodiment, varying includes adjusting the relative alignment of the program streams. Different embodiments of adjusting include inserting program material such as a pause at selected points in time, causing decoder buffers to underflow at selected points in time, and varying the rate of decoding and display at selected points in time.

8 Claims, 14 Drawing Sheets

5,877,812

METHOD AND APPARATUS FOR INCREASING CHANNEL UTILIZATION FOR DIGITAL VIDEO TRANSMISSION

I. BACKGROUND OF THE INVENTION

A. Field of the Invention

The field of the present invention is video compression.

B. Background

The present invention relates to the encoding, formatting, and distribution of compressed video programs. It is particularly, but not necessarily, applicable to a particular video compression technique known as variable bit-rate (VBR) encoding. VBR encoding can be used to overcome the well-known problem of most video compression encoders where the image quality tends to vary as a function of image complexity. Typically, a video program will contain a variety of scenes. Many of these scenes are lacking in motion or detail and are therefore easily compressed, while many other scenes contain complex details which are generally more difficult to compress, particularly when moving in a complex or random manner. Therefore, unless the available bandwidth is very high, the perceived quality of the decompressed and reconstructed images will tend to vary from one scene to the next. This problem becomes more serious as the available bandwidth is reduced until, eventually, the video quality becomes unacceptable, often because of just a few problem scenes.

VBR encoding overcomes this problem by allocating more bits to those scenes which are difficult to compress and fewer bits to those scenes which are more easily compressed. In this way, the decompressed and reconstructed images can be made to appear consistently uniform, and therefore superior to the reconstructed images derived from the constant bit-rate encoder adjusted for the same average rate of compression. As a result, it is possible to compress a video program more efficiently when using the VBR encoding technique. This not only increases the number and variety of programs or program streams that can be delivered over a fixed-bandwidth communication channel, but also reduces the storage capacity requirements at the head end or other site where the program library is maintained.

The disadvantage of the VBR encoding technique is that it presents certain problems when manipulating or editing the compressed bit-streams. In particular, it becomes difficult to efficiently utilize a fixed-bandwidth communication channel since the variable bit-rate stream may at times exceed the capacity of the channel, while at other times, it may utilize only a fraction of the available channel capacity. As would be clear to one in the art, the possibility of exceeding the capacity of the channel is not only a problem with VBR encoded data. The present invention is applicable also to non-VBR encoded data.

One known technique that is used to alleviate this problem is to buffer the compressed bit-stream at the transmission end of the communication channel in order to convert the variable rate stream to a constant rate stream. In such a case, it is also necessary to buffer the signal received at the other end of the channel in order to recover the variable rate stream that is necessary for proper timing of the reconstructed video images. Unfortunately, the required amount of buffering would be prohibitively expensive and would introduce long delays into the distribution system. Moreover, existing video compression standards such as the MPEG standards, a set of International Organization for Standardization/International Electrotechnical Commission (ISO/IEC) standards, specify limits on the amount of buffering required for conforming decoders. Therefore, it is important that the received bit-streams be decodable without exceeding these limits. That is, it is important to find methods for reducing the decoder memory requirements.

Another prior art technique that can be used to reduce the inefficiency of transmitting VBR encoded (and non-VBR encoded) programs over a fixed-bandwidth channel combines a plurality of program streams into a single multiplex. Although each additional program stream will increase the overall data rate of the multiplex, the variance of the average per stream data rate of this multiplex will tend to decrease in approximate proportion to the number of program streams, assuming approximate statistical independence of them. Therefore, if the nominal rate that can be accommodated by the channel is significantly greater than the average rate of a single program stream, then the channel utilization can be significantly improved. This technique is known in the art as statistical multiplexing.

When using buffering, one prior art method of assuring that buffer overflow does not occur is to add feedback between the encoder buffer and the encoder. When the buffer approaches a full state, a buffer fullness signal from the buffer informs the encoder to reduce the bit-rate so that the buffer does not overflow. When the buffer has more room, the feedback signal, from the buffer to the encoder, enables the encoder to increase the bit-rate in order to maintain image quality. Such feedback is particularly effective when combined with statistical multiplexing. A single encoder buffer may be used, or several buffers. In the case of a single buffer, it would be at the output of the multiplexer, and feedback from that buffer would be to all the encoders of the programs being multiplexed. Because the multiplexing reduces effective per stream data rate variance, in general, less memory would be required to convert the multiplex to a fixed bit-rate stream than if each individual encoder included a VBR-to-constant bit-rate buffer.

Statistical multiplexing with feedback for conveying encoded, particularly VBR encoded program streams over fixed-bandwidth channels, can be effective, but generally may not be sufficient when efficient utilization of the entire channel is important.

In addition, there are often situations where no feedback is possible between the output buffer of the multiplexer and the individual encoders. One such situation occurs when multiplexing already encoded data streams. Another occurs when the encoders are located in an area physically remote from the multiplexer. Both these situations are referred to herein as remote encoding, indicating that encoding and multiplexing are remote in time, location, or otherwise, so that no feedback is possible from the multiplexer to the encoders of the program streams to be multiplexed.

In addition, one of the factors that limits the efficiency of transmitting the multiplexed bit stream is the finite overall memory available for buffering at the decoder/demultiplexer. While statistical multiplexing usually provides sufficient benefit due to the small probability that all program streams will have complex scenes at the same time, there is still a finite chance of such data rate peaks occurring. To accommodate these peaks, long delays, and therefore large buffers, must be designed into the decoders in order to prevent the buffers from underflowing when the capacity of the channel is insufficient to deliver the data in time for decoding. The opposite extreme occurs when all of the programs contain scenes which are easily compressed. In this case, data can be delivered too quickly and the decoder buffers may overflow unless fill packets, containing stuffing bytes, are inserted into the bit stream. This reduces channel utilization (channel efficiency) since the fill packets are not useful for decoding and are discarded at the receivers.

Our co-pending U.S. patent application Ser. No. 08/560, 219 entitled "Method and Apparatus for Multiplexing Video Programs For Improved Channel Utilization," filed concurrently with the present application, incorporated herein by reference, and hereinafter referred to as "Our Multiplexing Invention," discloses a multiplexing method for determining the order of forming the multiplex that assures that no overflow occurs in any decoder buffer, thereby increasing the efficiency of transmitting the multiplex. Even when using the method of Our Multiplexing Invention, there is still a finite chance that all program streams have scenes at the same time of such complexity and that peaks in the decoder buffer memory requirement are such that no more decoder buffer space is available.

Thus, there is a need in the art for technology that can be used to reduce the size of data rate fluctuations in encoded video programs, in particular in VBR encoded programs.

Thus, there also is a need for technology for reducing the size of such data rate fluctuations when transmitting a stream of a multiplex of several encoded video programs, applicable to both real time encoding and remote encoding situations.

Thus, there also is a need for technology for reducing the chance that a buffer overflow condition occurs at the decoder.

Thus, there also is a need for technology for maximizing channel efficiency by avoiding sending fill packets of stuffing bits whenever possible.

Thus, there also is a need for technology for multiplexing that limits the size of the data rate fluctuations that occur during formation of the multiplex when multiplexing together several encoded video programs.

II. SUMMARY OF THE INVENTION

A. Objects of the Invention

Thus, an object of the invention is to provide a method (and apparatus) for reducing the size of data rate fluctuations in encoded video programs, in particular, VBR encoded programs.

Another object of the invention is to provide a method (and apparatus) for reducing the size of such data rate fluctuations when transmitting a stream of a multiplex of several encoded video programs, applicable to both real time encoding and remote encoding situations.

Another object of the invention is to provide a method (and apparatus) for reducing the chance that a buffer overflow condition occurs at the decoder.

Another object of the invention is to provide a method (and apparatus) for maximizing channel efficiency by avoiding sending fill packets of stuffing bits whenever possible.

Another object of the invention is to provide a method (and apparatus) for multiplexing that limits the size of the data rate fluctuations that occur during formation of the multiplex when multiplexing together several encoded video programs.

Another object of the invention is to reduce the decoder buffer size needed for decoding digital video.

B. Overview of the Invention

The above and other objects of the invention are provided for in a method (and apparatus) for reducing the size of data rate fluctuations that occur in forming a multiplex of a set of program streams; each program stream in said set decodeable by a corresponding decoder, each corresponding decoder including a corresponding decoder buffer, said decoder buffers having a maximum allowable size, and said method includes varying the formation of the different program streams in said set to minimize the size of said data rate fluctuations. In one embodiment, for the case of the streams being different segments of the same program, varying includes varying the segment length. In another embodiment, varying includes adjusting the relative alignment of the program streams. Different embodiments of adjusting include inserting program material such as a pause at selected points in time, causing decoder buffers to underflow at selected points in time, and varying the rate of decoding and display at selected points in time.

C. Related Inventions

Co-pending with the present application are our U.S. patent application Ser. No. 08/560,219 entitled "Method and Apparatus for Multiplexing Video Programs for Improved Channel Utilization" and application Ser. No. 08/561,296 entitled "Method and Apparatus for Modifying Encoded Digital Video for Improved Channel Utilization," both filed concurrently with the present application, and incorporated herein by reference.

III. BRIEF DESCRIPTION OF THE DRAWINGS

Figure 4:
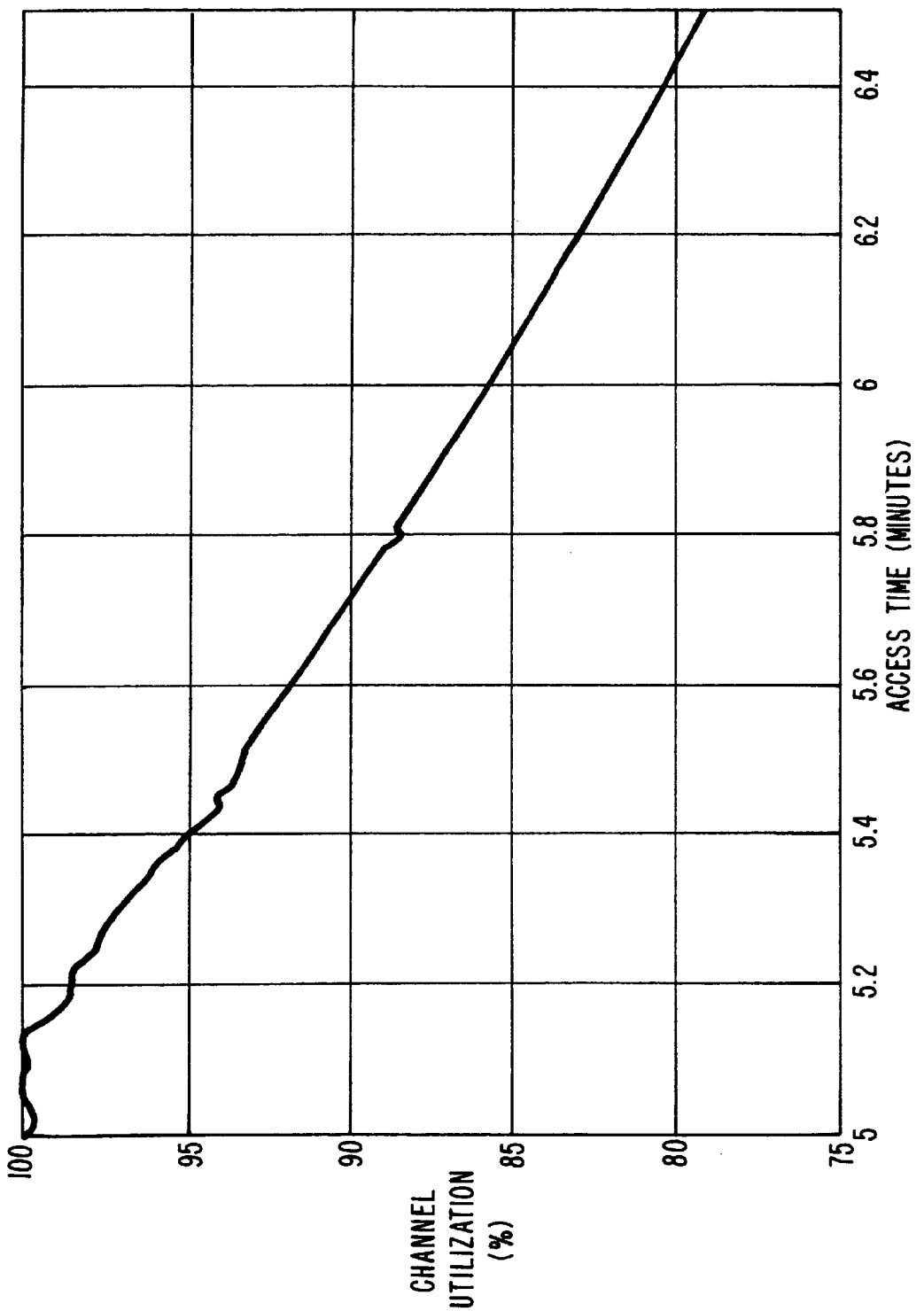
FIG. 4 shows the channel utilization (efficiency) as a function of segment duration T for the case of a two hour program consisting of both video and audio which was compressed (using MPEG-2), partitioned into segments of length T, and then multiplexed into a single stream.
Figure 5:
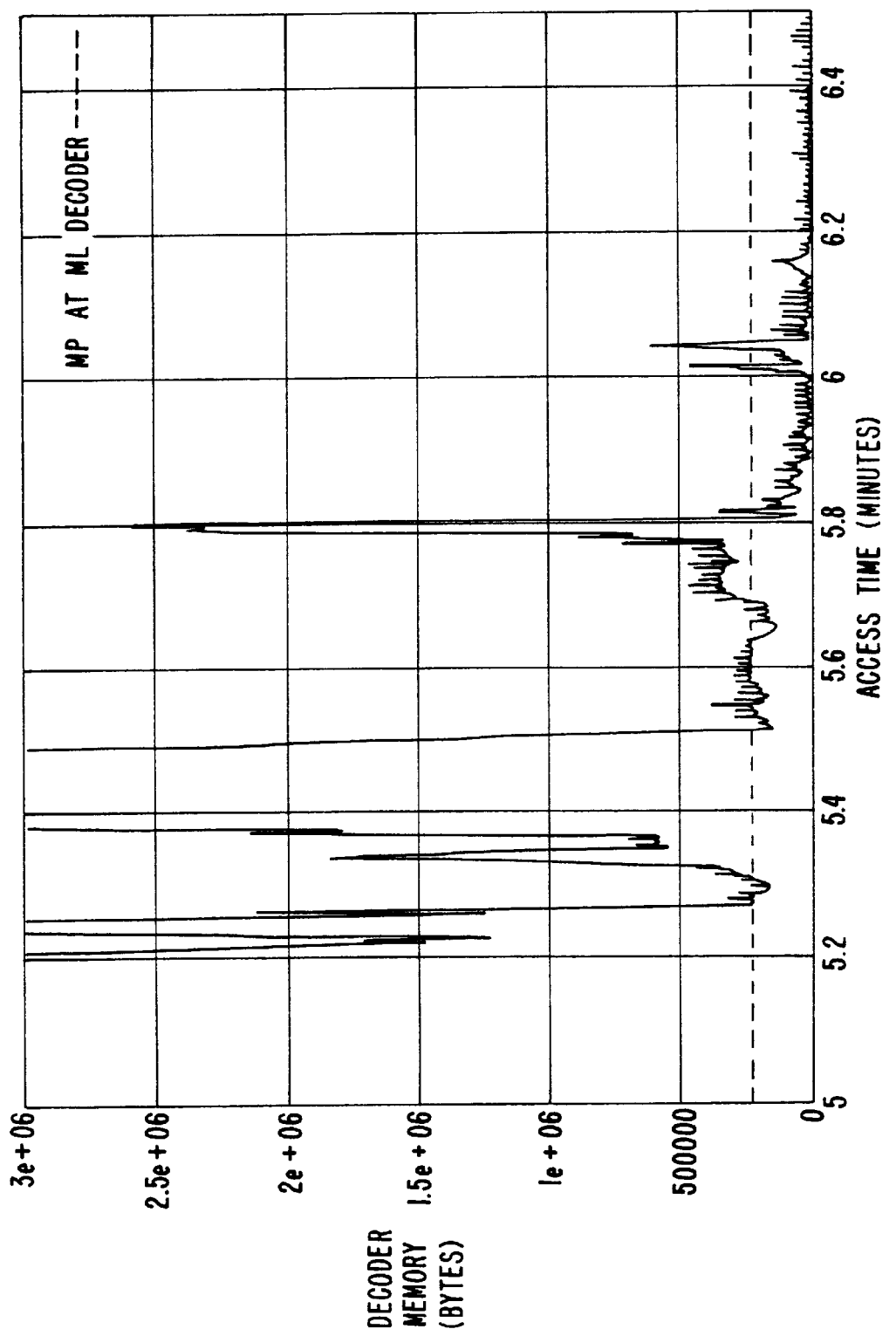

FIG. 5 indicates the amount of storage required when buffering the received signal at the decoder for the situation described in FIG. 4.

Figure 6:
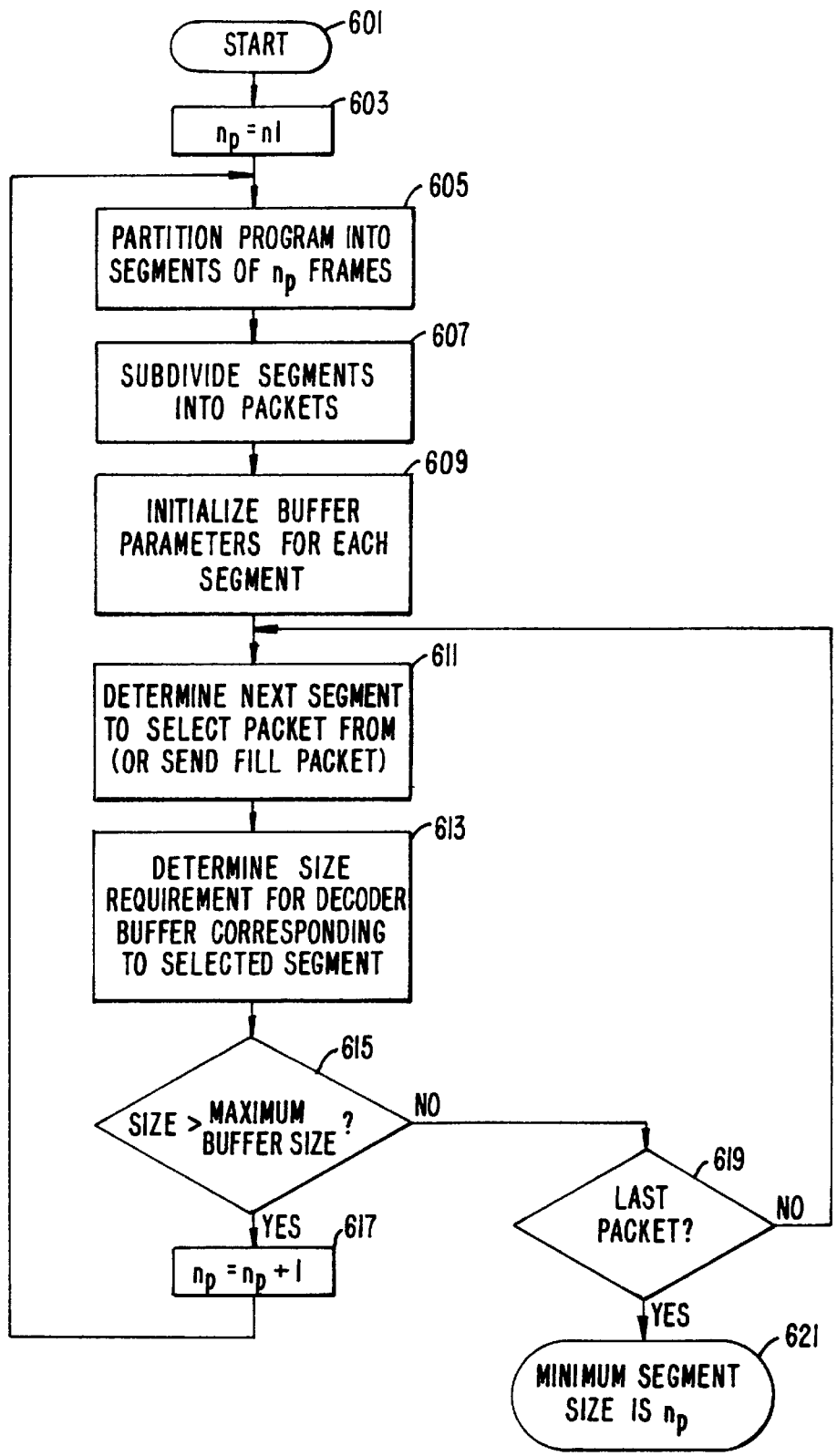

FIG. 6 shows the flow chart for the method, according to the preferred embodiment, for determining segment length T to prevent data peaks.

Figure 7:
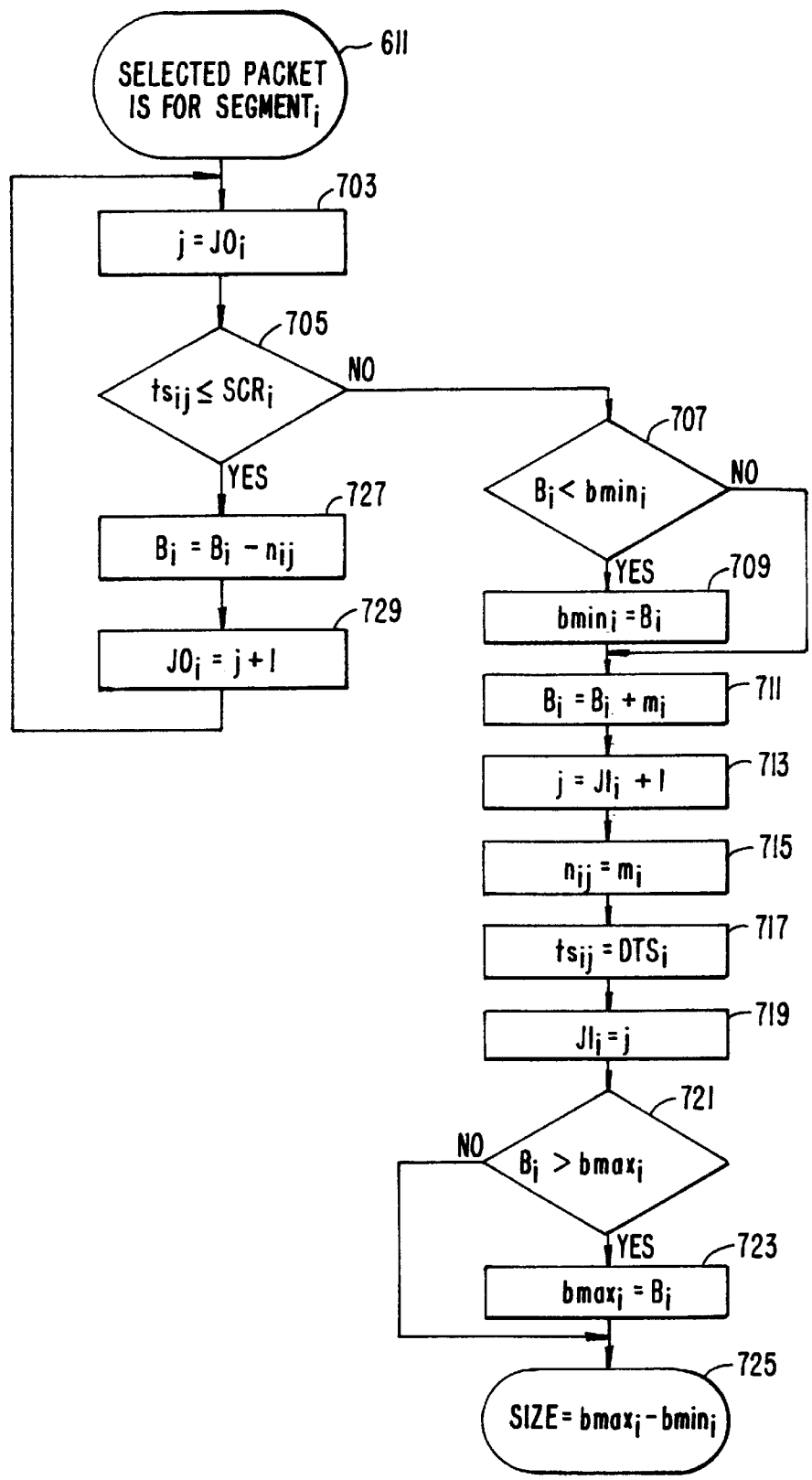

FIG. 7 shows the flow chart for the method, according to the preferred embodiment, for determining the size requirement for the decoder buffer for a segment i.

Figure 8:
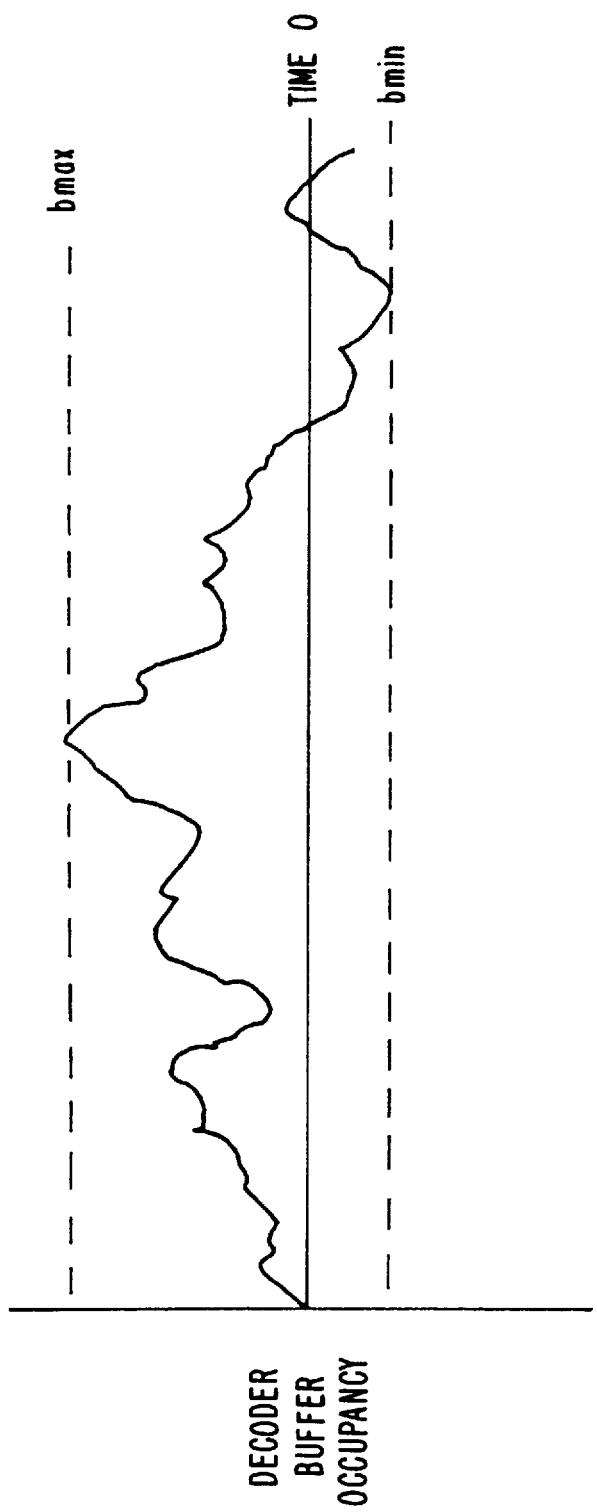

FIG. 8 shows, for the case of an independent program stream or a single stream, how decoder buffer occupancy varies with time.

Figure 9:
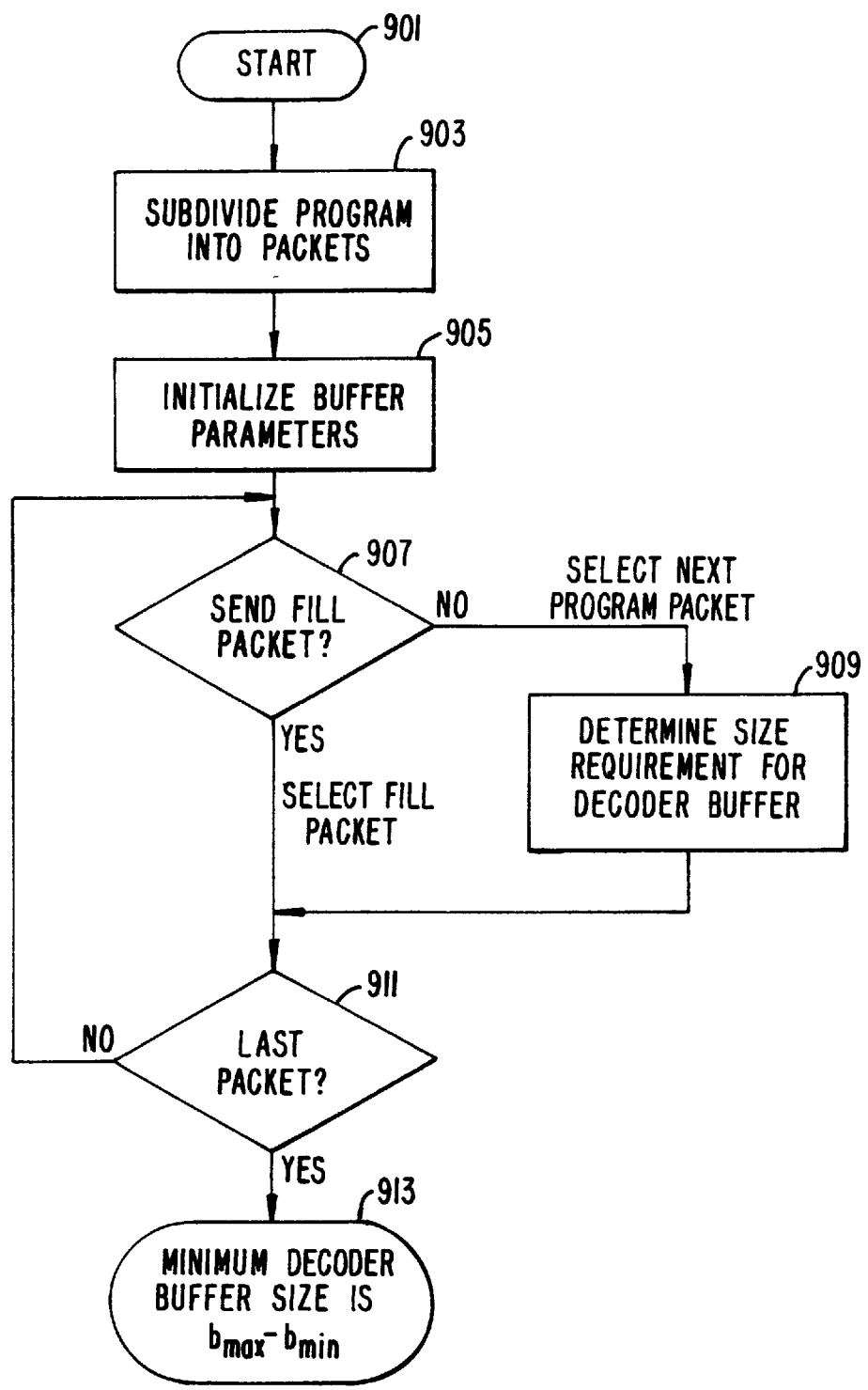

FIG. 9 shows the flow chart for the method, according to the preferred embodiment, of determining the decoder's minimum buffer size requirement, for the case of an independent program stream or a single stream.

Figure 10:
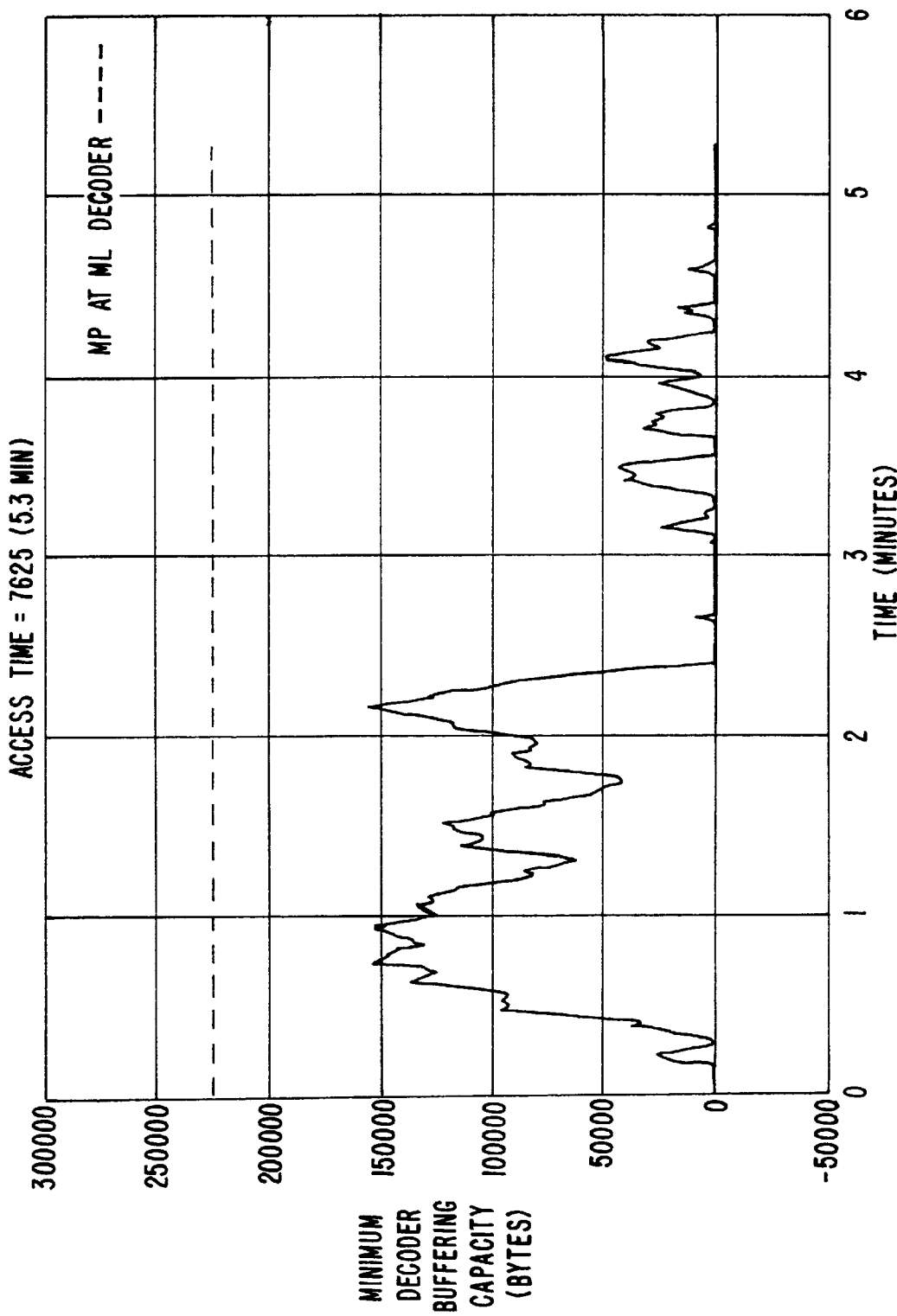

FIG. 10 shows the minimum decoder buffering capacity as a function of time for a 27 Mbits/second channel in the case of a two hour program consisting of both video and audio which was compressed (using MPEG-2), partitioned into segments of length T, and then multiplexed into a single stream.

Figure 11:
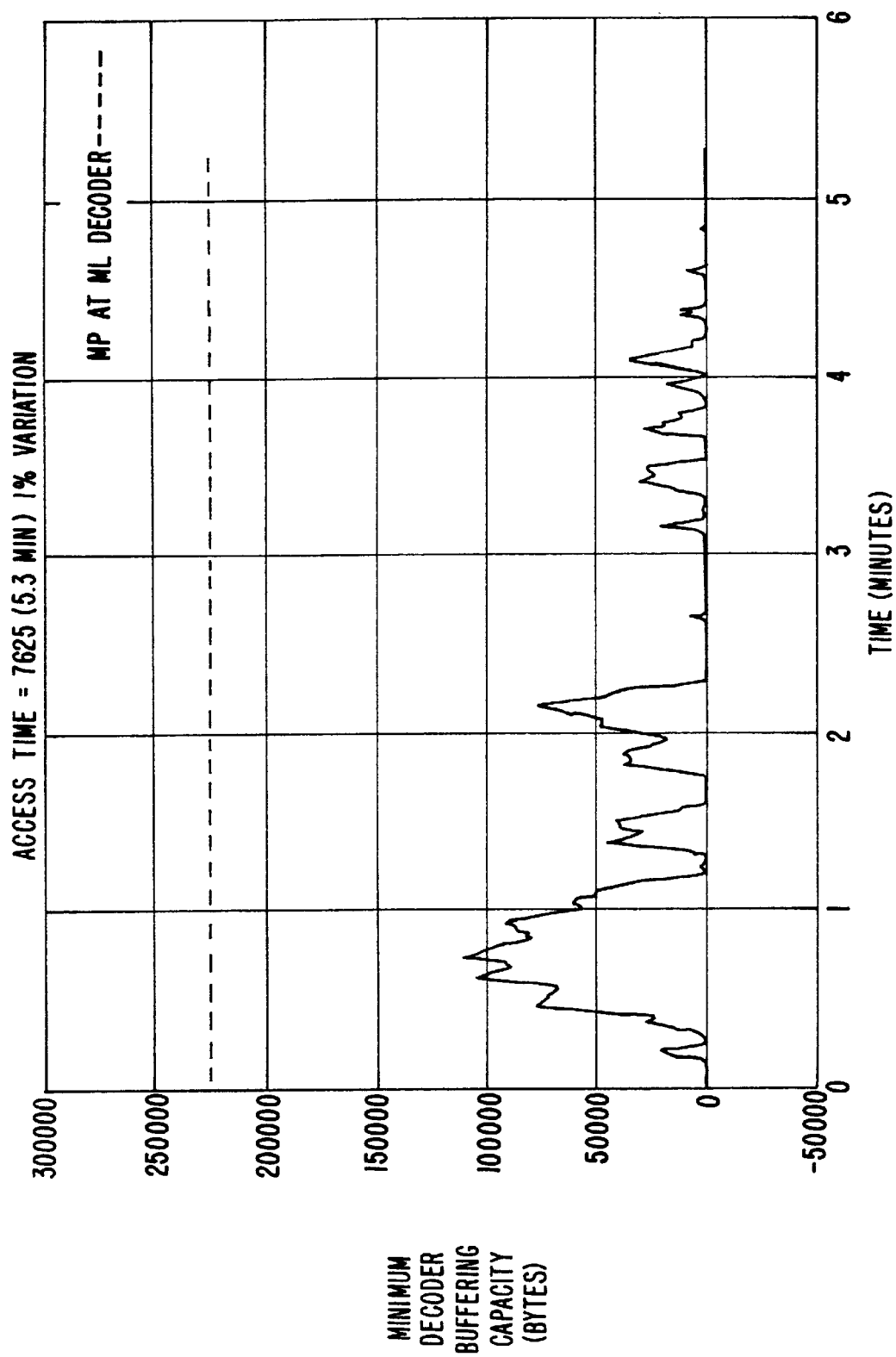

FIG. 11 shows the minimum decoder buffering capacity as a function of time for a 27 Mbits/second channel as the result of varying the rate of decoding and display by one percent, in accordance with one embodiment of the invention.

Figure 12:
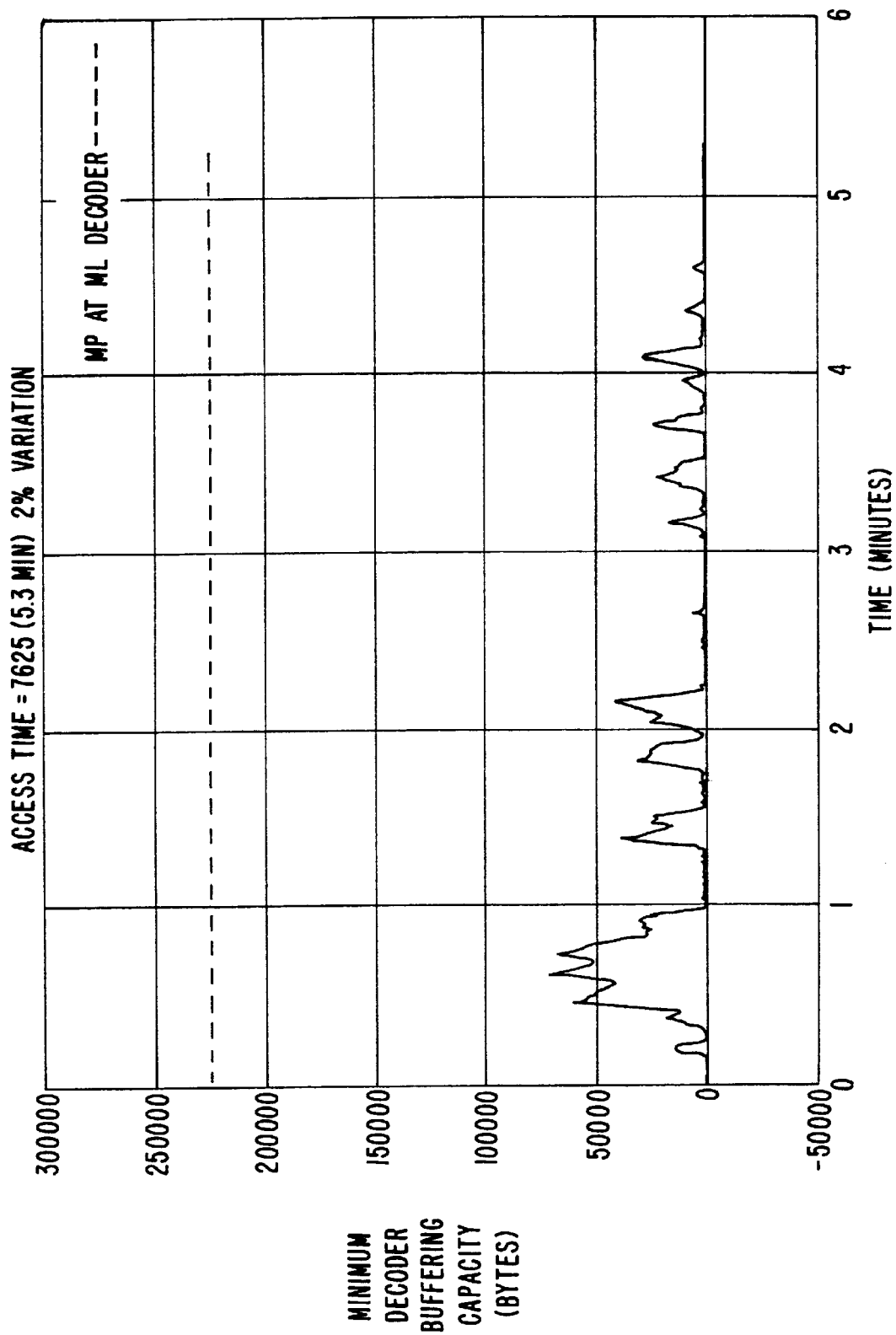

FIG. 12 shows the minimum decoder buffering capacity as a function of time for a 27 Mbits/second channel as the result of varying the rate of decoding and display by up to two percent, in accordance with one embodiment of the invention.

Figure 13:
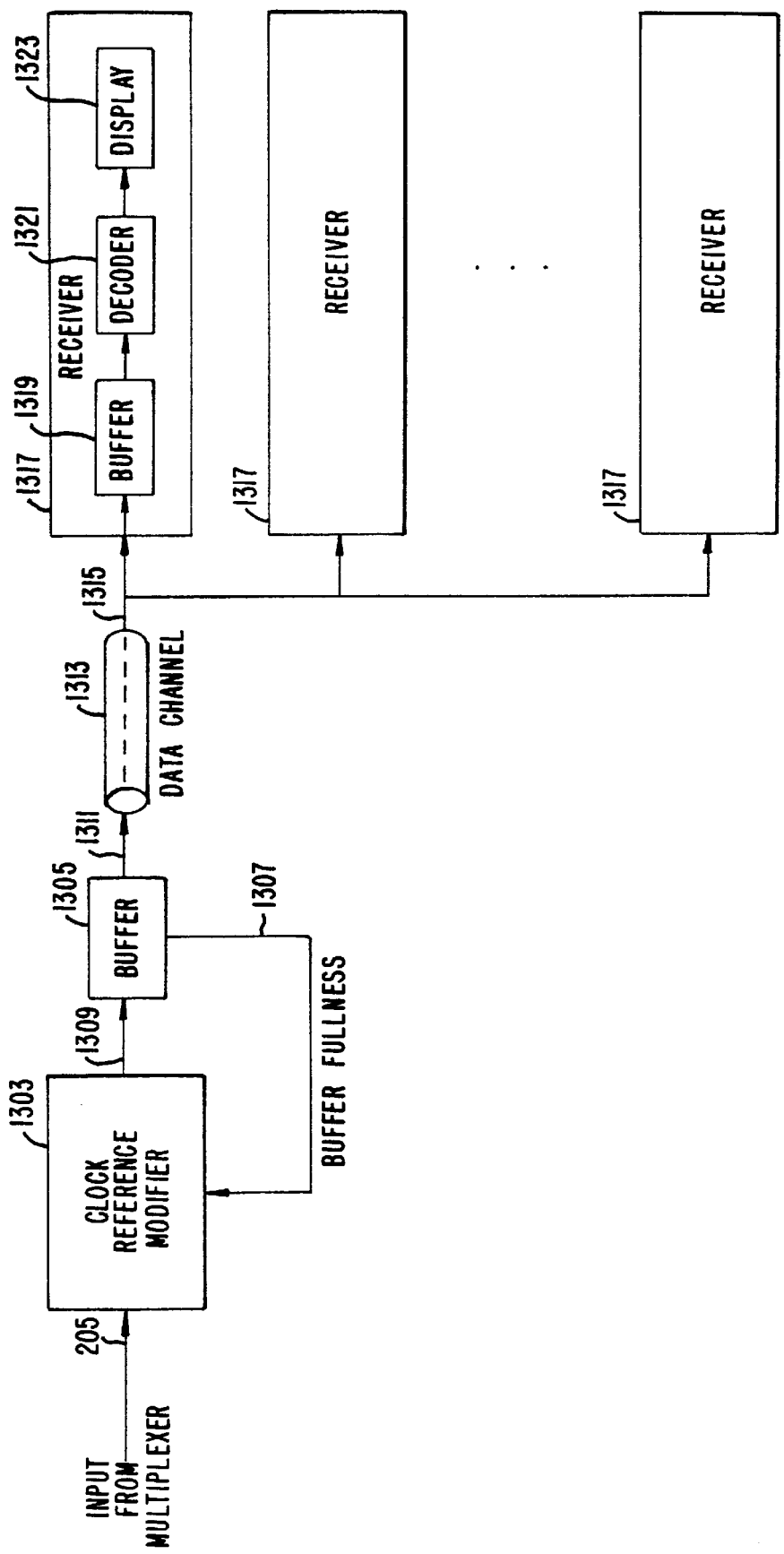

FIG. 13 shows a clock reference modifier circuit that varies the value of the transmitted clock references according to one embodiment of the invention.

Figure 14:
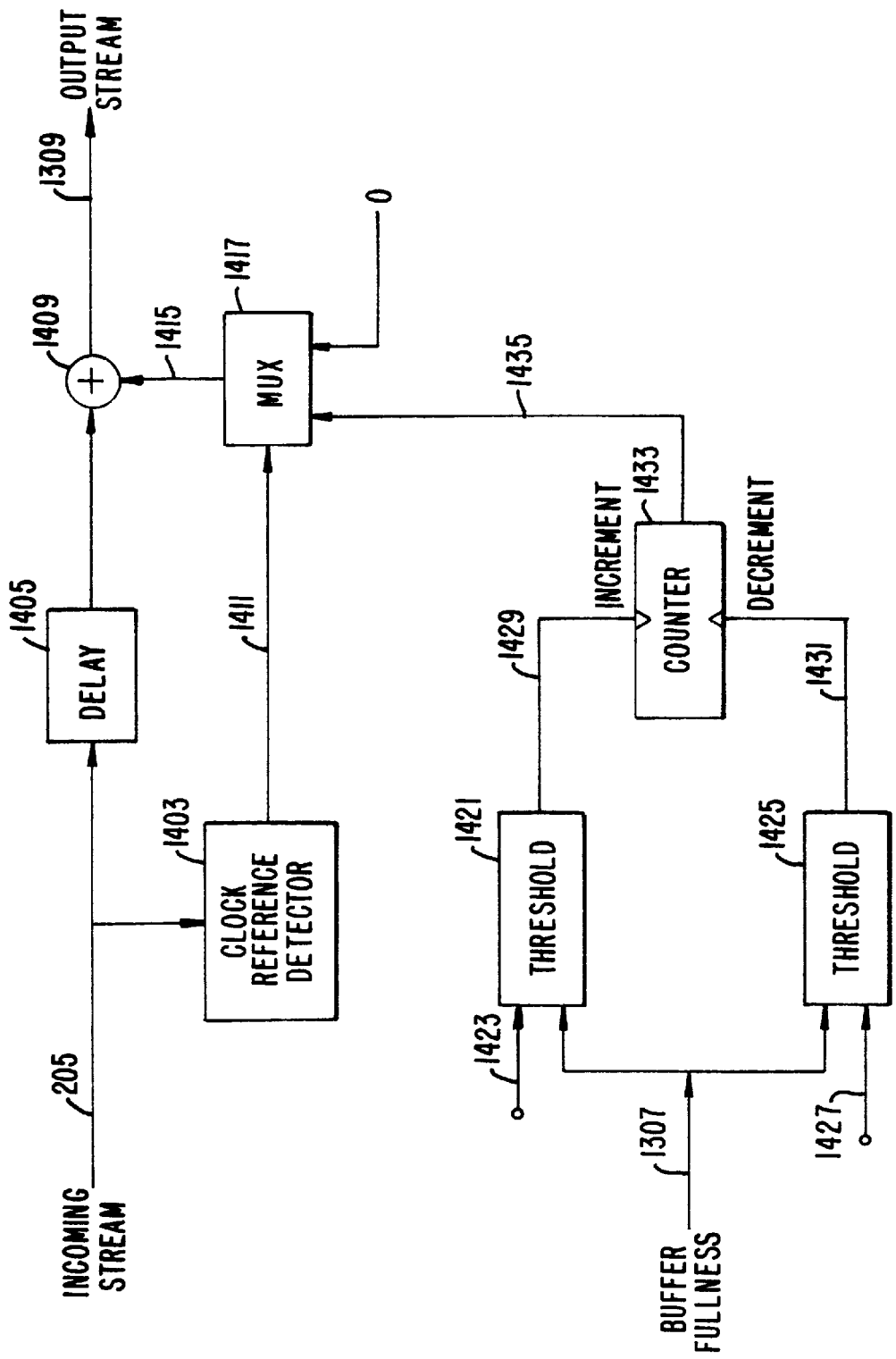

FIG. 14 shows the preferred embodiment of the clock reference modifier circuit on FIG. 13.

Figure 15:
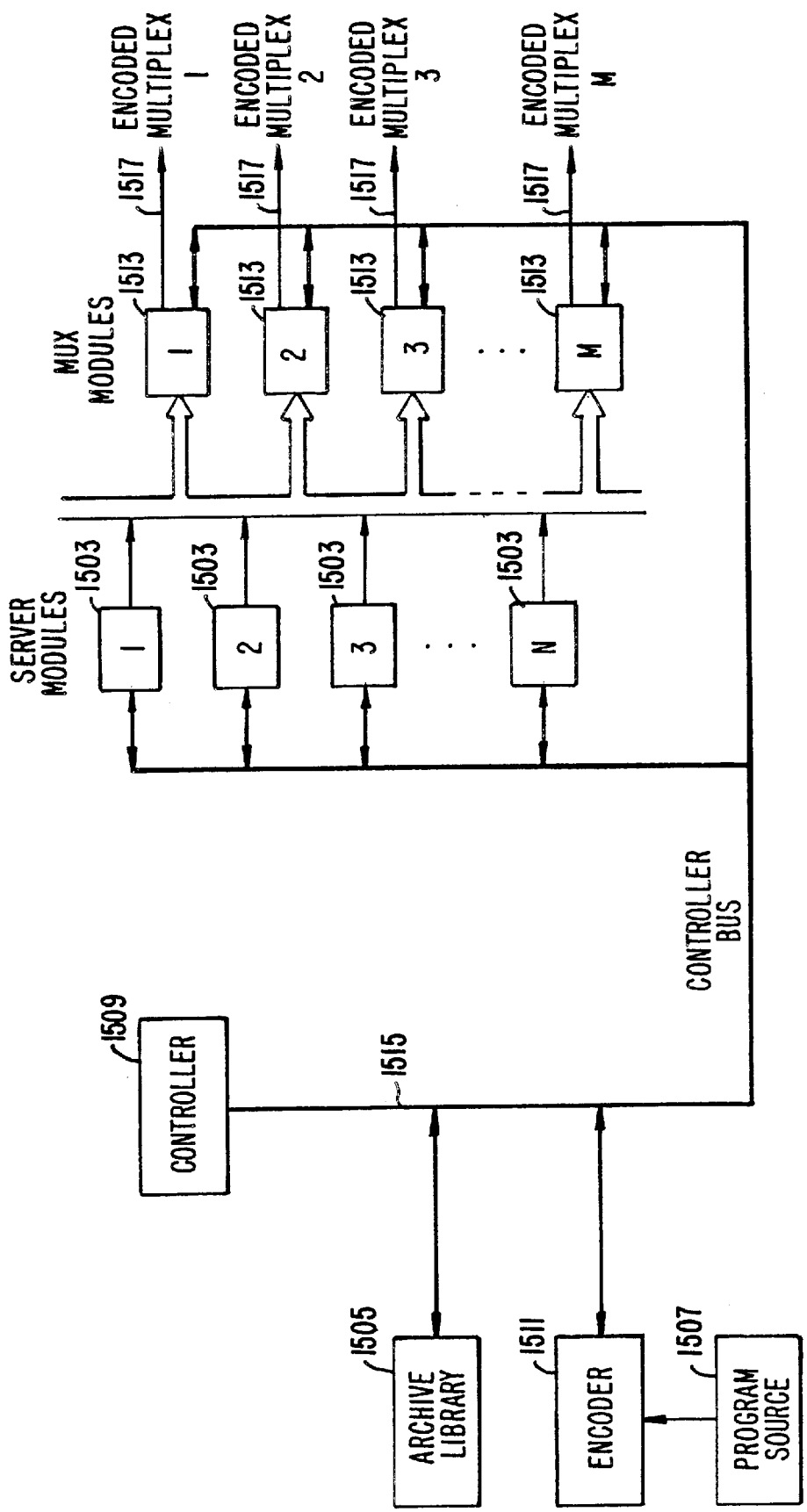

FIG. 15 shows the preferred embodiment of a server system capable of generating encoded multiplexes using the method of this invention.

IV. DESCRIPTION OF THE PREFERRED EMBODIMENT

A. Introduction

The preferred embodiment of the invention utilizes the presently known technique of variable bit-rate ("VBR") encoding and decoding of video data, including soundtrack or audio data, and uses a compression method to reduce the total amount of data required to represent a video stream. The present invention, however, is applicable also to non-VBR encoded data, as would be clear to one in the art. Although the preferred embodiment uses the MPEG coding standard, the invention is applicable to many other coding methods, as also would be apparent to one in the art.

The following detailed description is made with reference to FIGS. 1–15, in which like reference numerals indicate identical elements throughout all of the figures.

For convenience, several terms used in describing the invention are defined in the Appendix entitled "An Introduction to Video Coding and MPEG." The Appendix also explains many of the concepts of coding and MPEG that may be needed to understand the presented invention. It should be noted that some of the terms in the terminology section of the Appendix may have more than one meaning in the art. The meaning applicable in this description would be clear from the context to one in the art.

B. Overall Architecture of the Preferred embodiment

The invention deals with complete coded streams, including both video and audio. The preferred embodiment deals with MPEG streams of a single program. That is, MPEG encoded video, audio, and other data combined together as the MPEG stream of a single program. Such an MPEG stream is defined herein as a program stream.

Sometimes, details are provided herein only for dealing with the video stream component of the program stream, as it is the determining or limiting part. In any such case, how to process coded audio to be consistent with the method of the present invention would be straightforward to one in the art. Also, in all cases, realizing the present invention for streams coded by methods other than MPEG would be straightforward to one in the art.

Figure 1:
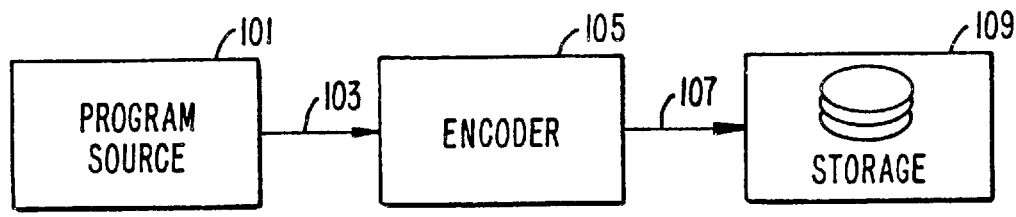
FIG. 1 shows an example of an encoding system.

An example of a video encoding system is shown in FIG. 1. Program source 101, such as a video tape recorder (VTR) or other program source, is used to supply uncompressed video 103 to an encoder 105. Encoder 105 receives uncompressed video 103 and applies a video compression process. In the preferred embodiment, the video compression is that specified by the MPEG-2 standard. It is preferred, but not necessary for the invention, that the video compression technique provides for a VBR mode that can be used to produce video streams which can be decoded to obtain images of substantially uniformly consistent quality. Many compression methods and standards, including MPEG, have such a VBR mode. Typically, the compressed output 107 of encoder 105 would be written to a digital storage medium (DSM) such as a disk or tape storage media 109 for playback at a later time, or transmitted directly to a data channel for broadcast or other transfer. That is, in the nomenclature of the MPEG standard, 109 is a DSM or channel.

Figure 2A:
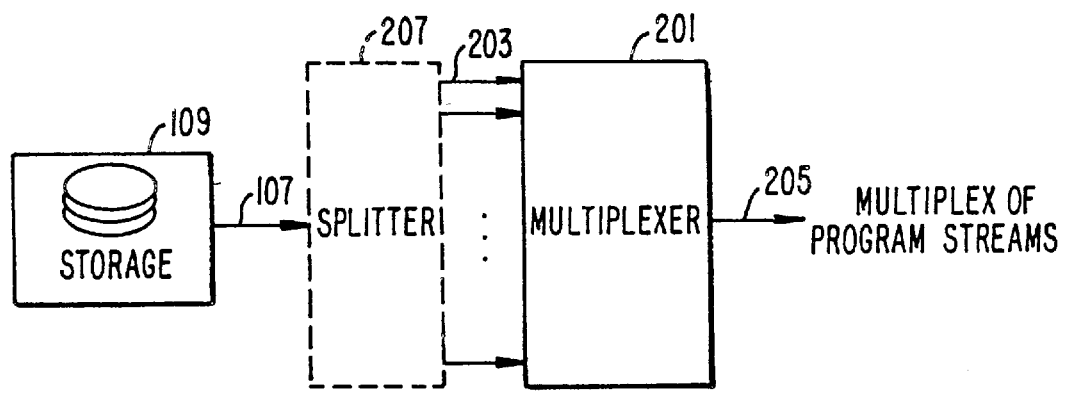
FIGS. 2A and 2B show systems for combining multiple compressed program streams into a single multiplex.
Figure 2B:
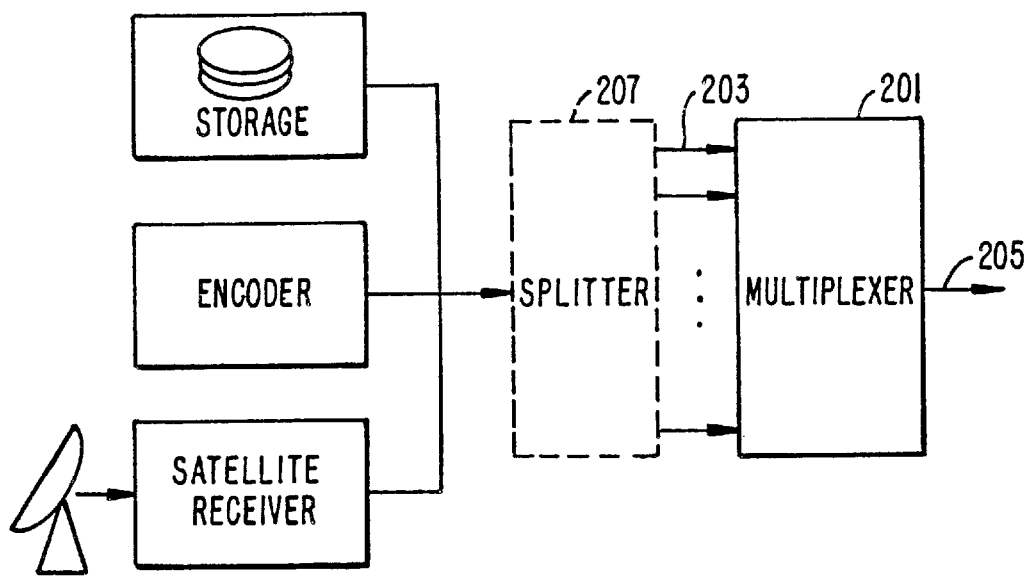

In the preferred embodiment of the present invention, multiple compressed program streams are combined into a single multiplex as shown in FIGS. 2A and 2B. The multiplexer 201 combines each of the program streams 203 retrieved from storage 109 or obtained from any other source, such as an encoder 209 and/or satellite receiver 211, into a single multiplex 205 that can either be broadcast immediately over the distribution system or returned to storage for broadcasting at a later time. One advantage of using the multiplexing process and apparatus, also called the combining process and apparatus, is to reduce the statistical variance in the video as compared to that of the individual VBR program streams 203. Additionally, the multiplexing method has the advantage of providing the viewer with a choice of retrieving or viewing any of the program streams contained in multiplex 205.

The multiplexing in the preferred embodiment is for a plurality of compressed program streams or for the case of transmitting several segments of a single data steam, such as a VBR or otherwise compressed program. In the single data stream case, one first partitions the compressed program into a plurality of segments using the splitter 207 shown in FIG. 2A. For example, some or all of program streams 203 combined by the multiplexer 201 could correspond to different segments of the same video program. By continuously transmitting the same multiplex of program segments over and over, it becomes possible for the receiver to eventually reconstruct the entire program by selecting and decoding a different program segment during each repetition of the multiplex. This technique is described in more detail in our co-pending U.S. patent application, application Ser. No. 08/326,511, filed Oct. 19, 1994 entitled "Method and Apparatus for Encoding and Formatting Data Representing a Video Program to Provide Multiple Overlapping Presentations of the Video Program," hereinafter referred to as "Our Video-On-Demand Invention" and incorporated herein by reference. One application of Our Video-On-Demand Invention is video-on-demand, where the user may choose to begin watching a program during any of a wide range of time intervals.

Figure 3:
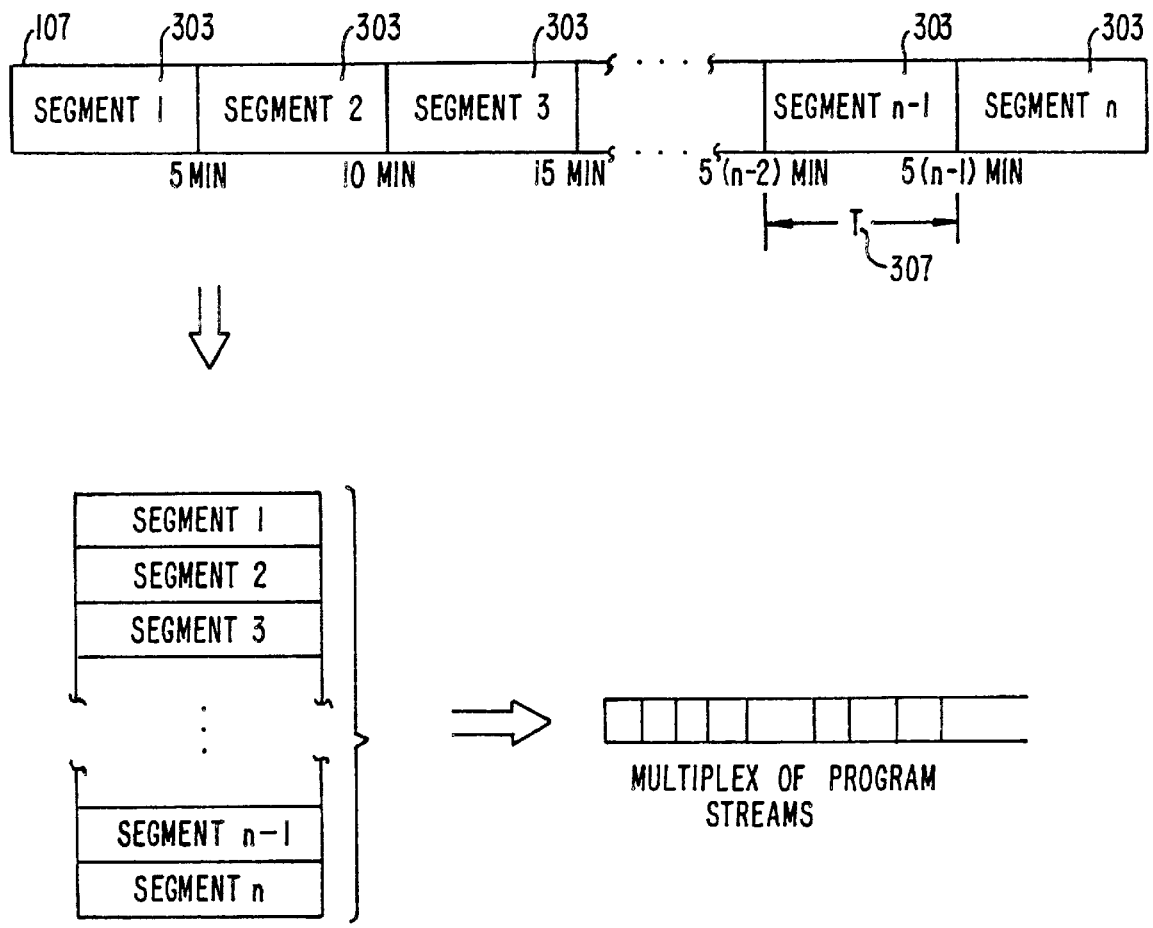
FIG. 3 shows the details of the video program stream, the n different segments, and the multiplexer output.

The splitting and multiplexing are shown in more detail in FIG. 3 for the case where program streams 203 correspond to different segments of the same video program and multiplexed output 205 is a multiplex of such different segments of the same video program. In the preferred embodiment of the present invention for the single original stream case, compressed program 107 is first split into a number, n, of segments 303 where each segment corresponds to a fixed time interval 307 of length T seconds. In the example illustrated in FIG. 3, T, the time interval 307, is 300 seconds (5 minutes). When segments 303 are compressed using VBR techniques, the compression ratio is allowed to vary over time, and different segments may contain differing amounts of compressed data.

As shown in FIG. 3, in the segmented single-stream case, each of the n different segments 303 becomes an independent program stream, and each of these n independent program streams subsequently are aligned to start at the same time, herein referred to as "stacking up." The stacked-up program streams 203 are multiplexed together using multiplexer 201.

A variety of multiplexing techniques may be used in multiplexer 201 without deviating from the scope of this invention. Two such multiplexing techniques are included in Our Video-On-Demand Invention. In the first such previously disclosed method, each of the program streams 203 is partitioned into variable-size packets where each packet contains the compressed data corresponding to a fixed number of pixels. Recalling that each of the program streams 203 is of the same duration and hence represents the same number of pixels, it follows that each of the program streams 203 will contain the same number of packets after partitioning. Hence, a fixed interleaving scheme may be used when multiplexing the packets from each of the n segments.

In the second previously disclosed multiplexing method, each of the program streams 203 is partitioned into fixed-size packets and the number of packets in each stream is allowed to vary. Multiplexer 201 orders the packets according to the sequence in which they are to be decoded at the respective decoder. The last packet of each stream in set 203 may be padded or truncated.

In the preferred embodiment of the present invention, the second above-mentioned scheme is used. That is, the original compressed program 107 is first partitioned into fixed-length packets, and, in the segmented stream case, is then split into segments by splitter 203. The advantage of this order is that the splitting of the program into segments by splitter 203 can be forced to occur at packet boundaries rather than at pixel boundaries.

Modifying for the case of multiplexing several video programs rather than segmenting a single stream before multiplexing would be clear to one in the art. Similarly, modifying for the hybrid case of multiplexing together segments of one or more programs with one or more independent video programs would also be clear to one in the art.

In the preferred embodiment, the multiplexing method used is that of Our Multiplexing Invention. The method assumes that all receivers that are "tuned" to a particular program stream use the same hypothetical decoder. Each such decoder has a single buffer to receive data from a single selected stream. Thus, when sending data from a particular program stream, the multiplexing method in the preferred embodiment effectively assumes the data will be sent along a particular communications channel (including the tuned hypothetical decoder). The method of Our Multiplexing Invention uses this assumption, for example, to estimate the fullness of the buffer of the hypothetical decoder corresponding to any stream to which the receiver containing the decoder is tuned. The word "receiver" as used herein means a receiving device which includes a decoder. The term "channel buffer" refers to this decoder's buffer. The assumption about such hypothetical decoders does not necessarily restrict the type of decoders or receivers with which the method of the present invention works. Rather, the assumption is used by the multiplexer to make certain decisions. Different levels of modeling the decoders are possible within the scope of the invention.

In Our Multiplexing Invention, each of the program streams 203 is assumed to have been subdivided into packets prior to multiplexing. Each time a packet is sent, the multiplexer selects the next packet by determining which of the decoder buffers corresponding to the n different channels will become empty first. The complexity of the determining step depends on how complete a model of decoders is maintained at the multiplexer. The more complete the model, the less computation is involved in determining the channel to send to. The method of Our Multiplexing Invention determines the order of sending data packets of program streams into the data channel. Whenever data is to be sent, the method determines which packet to send next by selecting a next channel that has a decoder buffer that is not approaching a full state. The method further includes selecting a channel that substantially balances the decoder buffers of the decoders with which the program streams are decodeable. In a further feature of that embodiment, balancing the decoder buffers includes keeping approximately the same time duration stored in each decoder buffer.

Although the method of Our Multiplexing Invention is used in the preferred embodiment, those in the art will appreciate that the present invention is applicable also to all other multiplexing methods and also to sending single (non-multiplexed) program streams and other digital video streams.

C. Detailed Description
Reducing Buffer Memory Requirements

As stated earlier, even with statistical multiplexing and the method of Our Multiplexing Invention, there is still a finite chance that all program streams have scenes at the same time of such complexity that the data cannot be transmitted to the decoders in time to prevent their associated buffers from underflowing. The method of the present invention essentially includes preventing the occurrence of or reducing the size of these data rate peaks that occur during formation of the multiplex.

In the case of the different program streams 203 being segments of a single compressed program as shown in FIG. 3, according to the preferred embodiment, increasing T, the segment length 307 (in units of time), reduces the buffer memory requirement. Increasing segment length 307, however, also increases the memory required at the receiver to provide a viewer with "instant" access to any part of the video program, in accordance with Our Video-On-Demand Invention. In the single program case, T also is called the access time. As an example, FIG. 4 shows the channel utilization (efficiency) as a function of segment duration T for the case of a two hour program consisting of both video and audio which was compressed (using MPEG-2), partitioned into segments of length T, and then multiplexed into a single stream. FIG. 4 shows how the channel utilization (efficiency) decreases as the duration of the program segments (access time) is lengthened. A fixed-bandwidth channel with a 27 Mbit/second capacity was assumed. FIG. 5 indicates the amount of storage required when buffering the received signal at the decoder. This is without using the present invention for reducing the size of peaks. Since storage capacity is likely to be limited on the receiving side and not on the transmitting side of the channel, the optimal segment length (access time) is typically the one which maximizes the channel utilization without requiring more than a pre-specified amount of memory in the receiving systems.

Also shown in FIG. 5 is a dotted line for the common MP@ML compliant decoders. As explained in the Appendix, MP refers to the MPEG-2 main profile for CCIR-601 resolution and ML refers to a subset of MPEG-2 features and to minimum specifications for main level decoder compliancy. An MP@ML compliant decoder has a buffer with at least 1.8 Mbits (225 Kbytes) of memory. For the particular example program shown in FIGS. 4 and 5, a segment length T of 5.3 minutes would result in a bit stream that is decodeable with this amount of memory.

The decoder memory requirement includes a number of factors. For instance, recalling that to display a complete program, the method and apparatus of Our Video-On-Demand Invention includes repeating over and over the transmission of the n program streams. If the channel is overutilized at the time of completion of each repetition of a program stream, then the delivery of data will be delayed, and this delay will further accumulate upon each segment transition. By the time the receiver is finished receiving the entire program, the total delay, and therefore the total decoder memory requirement, may have become quite substantial. In addition, the decoder must also provide sufficient buffering to accommodate all delays that occur prior to the completion of each segment. For example, if all of the program segments contain complex scenes at the same time, then the combined amount of data generated by all such segments will be relatively large, and a considerable amount of buffering may be required before all of this data can be transmitted. Since a similar amount of buffering must be provided on the receiving side, it is important to prevent or reduce the size of these data rate fluctuations that occur during formation of the multiplex.

The preferred embodiment for determining segment length T to minimize data rate fluctuations will now be described in detail for the case of the program streams being n segments of a program. For notation, denote by $bmin_i$ the minimum buffer occupancy level for a particular segment denoted by i; denote by bmax the maximum buffer occupancy level for segment i; denote by $J0_i$ the index of the first (i.e., oldest) packet in the decoder buffer for segment i; denote by $J1_i$ the index corresponding to the last (most recent) packet in the decoder buffer for segment i; denote by $ts_{ij}$ the decoding time stamp for the packet corresponding to the index j for segment i; and denote by $SCR_i$ either the system clock reference (SCR) for the next packet to be transmitted for segment i, or, if the SCR does not exist at that point, to the reference clock of the decoder model for segment i. As explained in the Appendix, in MPEG, the SCR is a time stamp in a pack header that defines when a particular byte is to enter the decoder, and thus can be used to set the reference clock of a decoder from time to time. Denote by $B_i$ the current buffer fullness estimate for the buffer of segment i; denote by $n_{ij}$ the size of the packet with index j in segment i; denote by $m_i$ the size of the next packet in segment i; and denote by $BMAX_i$ the maximum allowed decoder buffer size for segment i.

The method will be described with the aid of the flow chart of FIG. 6. The method starts at step 601 where an initial starting value n1 is selected for $n_p$, the number of pictures (video frames) in each segment. This also determines a starting value of n, the number of segments in the program, and T, the segment length, in units of time. In step 605, the method partitions the program into segments of $n_p$ pictures, and each segment is subdivided, in step 607, into packets. In step 609, the values of $bmin_i$, $bmax_i$, $B_i$, etc., are initialized, for example to be zero for all segments. That is, for all values of i. The method now goes through steps to determine the buffer size requirements packet-by-packet until all packets in all segments have been considered. Starting with the first packet, and then at any point in time, considering the next packet, the method determines, in step 611, the next segment i from which to select the next packet. This is the formation of the multiplex. Several methods can be used, and in the preferred embodiment, the method of Our Multiplexing Invention is used. The reader is referred to the flow charts of FIGS. 4(a) and 4(b) of our co-pending patent application for Our Multiplexing Invention for details of how the method selects either the next packet to append to the multiplex (hence the segment i from which that segment comes), or, if all decoder buffers for all segments i are full, a fill packet to append to the multiplex—such fill packets are to be ignored at the receiver. Once the segment i is selected, the size requirement for the corresponding decoder buffer is determined in step 613. Details of step 613 are shown in the flow chart of FIG. 7 and described below. The size is compared to the maximum buffer size allowed in step 615, and if the size is smaller than the maximum allowed, the method checks if all packets have been processed, and if not, loops back to step 611 to determine from which segment the next packet will be. If at step 619, the last packet is encountered, the method terminates with that value of $n_p$ to use for segment length T, since this is the lowest access time that will meet the maximum buffer size requirement. This value of T is the optimal segment length.

If at step 615, the buffer size requirement exceeds the maximum size allowed, a larger $n_p$ is selected at step 617, and the method loops back and repeats the steps to determine if that segment length would not exceed the maximum buffer size allowed.

The method for step 613 will now be described in detail with the aid of the flow chart of FIG. 7. The method starts after step 611 of FIG. 6 in which the segment i is chosen as the source for the next packet. In step 703, a temporary index, j, is set to the index of the first (i.e., oldest) packet in the decoder buffer for the selected channel i, that index denoted by $J0_i$. At step 705, $ts_{ij}$, the decoding time stamp (DTS) for the packet corresponding to the index j is compared to $SCR_i$, the reference clock of the decoder model. Step 705 thus determines if the oldest packet, based on the DTS, has already been removed from the buffer, in which case (1) in step 727, $B_i$, the current buffer fullness estimate, is reduced by $n_{ij}$, the size of the oldest packet, (2) in step 729, $J0_i$, the index corresponding to the first (oldest) packet is incremented, and (3) the procedure loops back to the beginning step 703. If the oldest packet is determined, at step 705, to still be in the decoder buffer, $B_i$, the current buffer fullness estimate is compared in step 707 to $bmin_i$, the current estimate of the minimum decoder buffer size for segment i. If $B_i$ is less than $bmin_i$, $B_i$ is set to $bmin_i$ in step 709. Otherwise, or after the adjustment of $B_1$, the method proceeds to step 711 where $m_i$, the size of the next packet is added to $B_i$, the current buffer fullness estimate, and (1) in step 713 the temporary index j is set to be one more than $J1_i$, the index corresponding to the last (most recent) packet in the decoder buffer for selected segment i, (2) in step 715, $n_{ij}$, the size of the packet corresponding to index j, is set to $m_i$, the size of the next packet, (3) in step 717, $ts_{ij}$, the decoding time stamp for the packet corresponding to the index j, is set to be $DTS_i$, the DTS for the next packet from channel i, and (4) in step 719, $J1_i$, the index corresponding to the last (most recent) packet in the decoder buffer for selected channel i, is reset to index j. The method now checks, in step 721, if the value of $B_i$ is greater than $bmax_i$, the present value of the maximum decoder buffer size. If this is so, then $bmax_i$ is set to be $B_i$ in step 723. Otherwise, or after the setting, the buffer size requirement is set at step 725 to be $bmax_i - bmin_i$.

Note that it is possible that step 613 (the flow chart of FIG. 7) returns a value of $bmin_i$ which is negative. This is shown in FIG. 8, which shows a typical variation over time of the buffer size required. A negative bmin would indicate an underflow condition. To deal with this, the starting time of that segment i can be adjusted to delay taking data out of the buffer until $-bmin_i$ data is sent to that decoder buffer. To implement this, one adjusts the PTS and DTS time stamps of all packets in that segment i by adding the time interval corresponding to $-bmin_i$ to these time stamps. Such a delay changes $bmin_i$ to 0, and $bmax_i$ is increased to $bmax_i - bmin_i$.

In an alternative embodiment of carrying out step 613, the size of decoder buffers are estimated by running models of the decoder buffers.

Thus, according to the preferred embodiment, the method adjusts the segment length T and the relative starting times of the different program streams 203 when the program streams 203 are different segments of the same program as shown in FIG. 3.

When the program streams 203 are different program streams, more degrees of freedom are available. The preferred embodiment of the method independently adjusts the starting times of the different program streams to change the relative alignment of the different program streams 203 which form the multiplex 205; and this is done to prevent the occurrence of large data rate fluctuations that result when either complex or simple scenes occur in multiple program streams at the same time. One method of varying the starting times is to insert short headers, consisting of previews or advertisements, at the beginning of one or more of the programs to be multiplexed.

It should be noted that even a change as small as the equivalent of one video frame (one picture) in the relative alignments of the program streams (or segments) can produce dramatic differences in buffer requirements, because typically, an extremely high memory requirement may correspond to many I-pictures being lined-up, and I-pictures have high data requirements. Moving the relative alignment by only one picture in such a situation would cause the previously aligned I-pictures to lose alignment. This is the reason for the spikes which occur at regular intervals in FIG. 5. A dramatic change similarly may occur in the case of multiplexing segments of the same program when segment length T is changed by as little as the equivalent of one video frame.

Introducing Pauses or Other Material, and Controlled Underflowing

An alternate embodiment to adjusting starting times or segment lengths introduces short pauses at key locations in selected program streams. In this way, certain complex scenes can be delayed so that they will no longer coincide with the complex scenes of other program streams 203. Preferably, these pauses are inserted at scene changes where they are less likely to be noticed or less likely to be disruptive. One method of inserting pauses is to insert the pauses as encoded segments into the encoded program stream at the selected points in time. Alternatively, the pause is achieved by repeating the first frame following a scene change one or more times. Usually, such a repetition is not noticeable to a viewer after decoding.

In another alternate embodiment, instead of a pause, other program material is inserted into a scene. This material may include messages, advertisements, previews, simple blank screens, or other appropriate material. Preferably, the inserts are chosen to be easier to compress than the program streams into which they are inserted. Preferably, the inserts are pre-compressed and inserted as compressed segments.

In yet another alternate embodiment, the effects of pauses are introduced by replacing potential buffer overflow conditions with underflow conditions. Causing an underflow when there is too much data to send through the data channel to a given size decoder buffer is equivalent to freezing the image presented by the decoder. This is preferable to allowing an overflow, which may cause the image presented to be corrupted.

Selectively inserting pauses and/or selectively inserting other program material and/or selectively causing an underflow condition can be done during formation of the complete multiplex. Alternatively, this can be generalized to selectively inserting pauses and/or selectively inserting other program material and/or selectively causing an underflow condition independently for each of the n program streams comprising the multiplex.

Since selectively inserting pauses and/or selectively inserting other program material and/or selectively causing an underflow condition can be done independently for each of the program streams, the method of the present invention is applicable also to the case of avoiding large data rate fluctuations that might cause the decoder buffer to overflow when there is a single encoded stream to transmit via a data channel to a decoder.

Details will now be provided for the case of selectively causing an underflow condition independently for each program stream. A single such independent program stream will be considered. How to generalize for the other above-mentioned situations would be straightforward to those in the art.

The case of a single independent program stream is identical to the case where there is no multiplexing. Hence, when there is only one segment (that is, there is no multiplexing), denote by bmin, bmax, J0, J1, $ts_j$, B, $n_j$, and BMAX the corresponding parameters as above for segment i (indicated above by the subscript), but for the single segment (hence no i subscript).

The preferred embodiment for allowing controlled underflow of the decoder buffer is now described in detail.

The first step is determining bmin and bmax, the minimum and maximum buffer storage requirements, respectively. FIG. 8 shows how bmin and bmax typically vary over time. Note that if fill packets are sent at the peak of the graph of FIG. 8, bmax would be lowered, which is one method of reducing the buffer requirement. Causing underflow, as described below, has the effect of reducing the magnitude of bmin, which again lowers the buffer requirement.

A method of determining bmin and bmax will now be described with the aid of the flow chart of FIG. 9. This is a simplification of the flow chart of FIG. 6, which is for the multiple stream case. After starting (step 901), in step 903, the stream is divided into packets. In step 905, all parameters such as bmin, bmax, B, etc., are initialized, for example, to be zero. Next, at step 907, a determination is made as to whether a fill packet should be sent in order to avoid overflowing the decoder buffer. Otherwise, the next packet of the program would be sent. In the generalization to multiple streams, this step would determine either if a fill packet is to be sent, or which packet (from which program stream) to next send, as described in the flow charts of FIGS. 4(*a*) and 4(*b*) in the co-pending application for Our Multiplexing Invention. If at step 907, it is determined that a next packet from the program stream is to be sent, the method in step 909 determines the size requirements for the decoder buffer. The details of step 909 are given in the flow chart of FIG. 7, where in this case, since there is only one stream, subscript i should be dropped for all variables. After step 907, if a fill packet is sent, or, after step 909, if the next packet is to be sent, the method checks, in step 911, if all packets have been considered. If not, the method loops back to step 907, otherwise, the method terminates with the needed maximum decoder size as bmax−bmin.

As before, it is possible, as is shown in FIG. 8, that bmin is a negative quantity. Normally, in a case where the needed maximum decoder buffer size is less than the maximum allowed, a negative bmin may be handled by adjusting all the PTS and DTS time stamps by adding the time period corresponding to −bmin to these time stamps. The case of interest is when the needed maximum decoder size is larger than the maximum permitted, which, in MP@ML decoders, is 1.8 Mbits. Denoting this maximum by MAX, a new value of bmin, denoted as bmin' is determined as bmin'=bmax−MAX. All PTS and DTS time stamps in the stream are adjusted by adding to them the time interval corresponding to bmin' rather than bmin. The effect is to cause the decoder to work within its existing buffer memory by causing it to underflow, hence freezing the image, at times when there is too much data to send through the data channel. This is preferable to allowing the overflow.

Note that in the flow chart of FIG. 9, instead of sending fill packets in step 907 and thereby limiting the magnitude of bmax, one can insert a pause or permit a controlled underflow in step 909, thereby limiting the magnitude of bmin. In both cases, the resulting buffer size, as determined by the distance between bmax and bmin, is reduced.

Extending this to the case of having a multiplex of several program streams would also be straightforward to one in the art.

Modifying the Rate of Decoding

In yet another embodiment of the invention, reducing the decoder's buffer memory requirement is achieved by introducing slight alterations to the rate at which the program is decoded and displayed. This method can also be used to reduce the chance of one of the decoder buffers underflowing when the overall communications channel is overutilized. In such a situation, there would be excess data waiting to be transmitted, and the video frames would tend to arrive in the decoder buffer at a rate that is somewhat slower than the rate at which they are decoded and displayed when they leave the decoder buffer, which can cause underflow. Thus, the probability of underflowing the decoder's buffer can be reduced by slowing the rate of decoding and display. This also permits the use of a smaller decoder buffer since the input and output rates will be more closely matched.

FIG. 11 illustrates the result of (1) reducing the rate of decoding and display by one percent, in accordance with the invention, when the data channel is overutilized, and (2) increasing the rate by one percent, when the data channel is underutilized. FIG. 10 shows the same data when such change in decoding and display is used. FIG. 12 shows the same data when the rate of decoding and display is allowed to vary by as much as two percent. To produce these FIGS. 10–12, an original two hour program, consisting of both video and audio, was compressed using (MPEG-2), into a compressed stream 107, partitioned into 5.3 minute segments 203, then the program segments 203 were multiplexed into a single stream 205. FIGS. 10–12 show the minimum amount of decoder buffering capacity as a function of time if this multiplex 205 is transmitted through a 27 Mbit/second channel. Whenever this level is shown to be zero, the channel is not fully utilized, and fill packets are sent, which later are discarded at the receivers and are not inserted into the decoder buffers. The channel is fully utilized when the minimum decoder buffering capacity exceeds zero, and in this case, the incoming data must be delayed at the transmitter until the channel becomes available. Also shown in FIGS. 10–12 is a dotted line corresponding to the buffering capacity of the common MP@ML compliant decoders.

Thus, it is clear that there are advantages in periodically changing the rate of decoding and display. Such advantages include improved channel utilization, reduced buffer requirements, and therefore, reduced transmission delays.

According to one preferred embodiment of the present invention in which the MPEG-2 standard is used, varying the rate of decoding and display is carried out by using the time stamps in the pack and packet headers. Each decoder maintains an internal system clock reference (SCR) which may be modeled as a continuously incrementing counter. By periodically sending the current SCR to correct each decoder's internal approximation, and by comparing all time stamps with these internal approximations of the true SCR, all decoders can maintain the correct synchronization with the incoming data stream.

Thus, according to the one preferred embodiment, small variations are introduced into the decoders' timing by altering the value of the transmitted time stamps. Alternatively, the value of the transmitted SCRs may be varied. FIG. 13 shows a clock reference modifier circuit 1303 that carries this out. It receives the stream 205 from the multiplexer 201, detects and modifies the clock reference values that are embedded in the bit-stream, and then deposits the modified data stream 1309 into a decoder buffer 1305 to await transmission.

FIG. 13 also shows buffer fullness signal 1307 and a set of decoders 1317 which each include a decoder buffer 1319 for receiving data 1315 from the communication channel 1313.

FIG. 14 shows the preferred embodiment of the clock reference modifier circuit. A clock reference detector 1403 parses the incoming data stream 205 and detects the embedded clock references. The output of the Clock Reference Detector is a gate signal 1411 which causes a multiplexer (MUX) 1417 to output an adjustment factor 1415. A short pipeline delay 1405 is inserted into the path of the data stream 205 so that the alignment of the adjustment factor 1415 will coincide with the original clock reference value when it is added back into the data stream by adder 1409 to produce the output stream 1309.

The value of the adjustment factor 1415 is determined from the buffer level 1307 as follows:

An advance thresholder device 1421 set by an advance threshold level 1423 is used. As the buffer becomes empty and the buffer fullness 1307 drops below the advance threshold level 1423, advance thresholder device 1421 generates an increment signal 1429 to the up-down counter 1433, used to provide the adjustment factor 1435 to MUX 1413. This, in effect, causes the clock reference value to increase, which will have the effect of speeding up the rate at which data is decoded and displayed at the decoder 1317. Similarly, retard thresholder device 1425 set by a retard level 1427 is used. When the buffer fullness 1307 goes up sufficiently to exceed retard level 1427, retard thresholder 1425 generates a signal 1431 to decrement the reference clock 1433, causing the adjustment factor 1415 from MUX 1413 to decrease. Thus, the clock reference values will begin to decrease, resulting in a slower rate of decoding and display at the decoder 1317.

Thus, a method and apparatus has been disclosed for adjusting the "global" decoding and display rates affecting the entire multiplex 205.

The method and apparatus of the present invention also provides for individually adjusting the rate of one or more program streams 203 contained in multiplex 205. This allows the individual program streams to be carefully aligned, and thus is used to prevent the occurrence or limit the size of data rate fluctuations in the multiplex 205. Either the time stamps or the clock reference values may be adjusted in the individual program streams before they are multiplexed together.

Similarly, even when there is a single stream, that is, no multiplexing, one can use the method and apparatus of the present invention to adjust the rate of the stream to prevent the occurrence or limit the size of buffer level fluctuations in both the transmitting and receiving systems.

Thus, a method has been disclosed that can be used to send encoded video across data channels with improved transmission efficiency while preserving the full quality of the pre-compressed signal.

Description of a Server Apparatus

The preferred embodiment of a server system capable of generating encoded multiplexes 205 using the method of this invention is shown in FIG. 15. On-line storage for compressed programs is provided by individual server modules 1503. For example, each server module may have a hard disk large enough to contain one program that has been compressed using VBR (or other) encoding techniques. Additional off-line storage may be provided by an archive library 1505 which may consist of one or more magnetic tape drives and a library of magnetic tapes. The programs stored in this library could also exist in the same compressed format. New program material can be included into the system either by adding a new tape to the archive library or by using a program source 1507 such as a Video Tape Recorder (VTR) to supply uncompressed video to an encoder 1511. A controller 1509 is used to manage the operation of the system. In the preferred embodiment, the controller is a computer. Controller 1509 serves as an interface to the operator when entering or modifying programming schedules, controls the transfer of programs between the archive library 1505 or encoder 1511 and the server modules 1503, analyzes programs or maintains files describing the characteristics of each program, and determines how the multiplexes should be formed according to the present invention. The controller 1509 instructs an individual MUX module 1513 to accept compressed program data from one or more selected server modules 1503. Each MUX module 1513 is capable of adjusting the clock reference values embedded in the data stream when the data rate exceeds or falls below pre-determined channel capacity thresholds, and inserts fill packets when the output data rate falls below a second pre-determined channel capacity threshold. If properly instructed by the host, the MUX module 1513 will also introduce pauses, insert messages or other program material supplied by one of the other server modules 1503, according to the present invention.

Thus, a method and apparatus has been disclosed for reducing decoder buffer size for multiplexed digital video transmission.

The foregoing description of preferred and alternate embodiments of the invention has been presented for purposes of illustration and description. It is not intended to be exhaustive or to limit the invention to the precise forms disclosed. Obvious modifications or variations are possible in light of the above teachings. The embodiments are chosen and described to provide the best illustration of the principles of the invention and its practical application in order to enable one of ordinary skill in the art to utilize the invention in various embodiments and with various modifications, as are suited to the particular use contemplated. All such modifications and variations are within the scope of the invention as determined by the appended claims when interpreted in accordance with the breadth to which they are fairly, legally, and equitably entitled.

Appendix: An Introduction to Video Coding and MPEG

A. Terminology

For convenience, several terms used in describing the invention are now defined. The concepts behind the terms listed in this terminology section are explained in the sections that follow. It should be noted that some of these terms may have more than one meaning in the art. The meaning applicable to the description section would be clear from the context to one in the art.

MPEG: The MPEG standard, a set of International Organization for Standardization/International Electrotechnical Commission (ISO/IEC) standards. Two variations of MPEG have been agreed to; MPEG-1, documented in ISO/IEC publications 11172 ("Coding of Moving Pictures and Associated Audio for Digital Storage Media"), and MPEG-2, documented in ISO/IEC publications 13818 ("Generalized Coding of Moving Pictures and Associated Audio Information"). As used herein, MPEG refers to either MPEG-1 or MPEG-2 without distinction.

Remote coding: Encoding programs independently of encoding of any other programs and independently of any multiplexing of the coded streams, either because of remote physical location, or for other reasons.

Frame: The basic unit of audio coding. MPEG audio bit-streams are broken down into frames. The term "frame" is also commonly used for the unit of a video sequence. A video frame often is referred to as a "picture" herein.

Picture: A video frame, the unit of a video sequence.

Pixel: A "picture element" of a picture. In the arts of digital video and video coding, a picture may be thought of as a discretized two-dimensional array of pixels.

Pel: A picture element. The same as a pixel.

Field: In video, a subset of the pixels of a picture transmitted separately. In interlacing, a picture is split into two or more fields. In NTSC and PAL, each field consists of the pixels in alternating horizontal lines of the picture.

Interlacing: The splitting of a picture into two or more fields.

Image coding: The art of image compression.

Color quantization: Reducing the number of bits in a pixel required to represent that pixel. Color quantization also means digitizing the numbers representing the colors of a pixel.

Intra-coding: Image coding which takes into account spatial redundancies in a picture, including color quantization, but which does not use temporal variations from picture-to-picture.

Inter-coding: Image coding which takes advantage of temporal redundancies from picture-to-picture in a video sequence.

Intraframe coding: The same as intra-coding.

Interframe coding: The same as inter-coding.

Motion estimation.: Computing the spatial displacement due to motion from picture-to-picture in a video sequence.

Motion compensation: Using motion estimation to compensate for motion from picture-to-picture in a video sequence.

I-picture: In MPEG, a picture that uses purely intra-coding, and thus, is processed independently of other pictures I-frame: Same as an I-picture.

Intraframe coded picture: Same as an I-picture.

P-picture: In MPEG, a picture that is coded using a previous I-picture or a previous P-picture. The compression of P-pictures relies on temporal prediction from previous I- or P-pictures using forward motion estimation and compensation.

P-frame: Same as a P-picture.

Predictively coded picture: Same as a P-picture.

B-picture: In MPEG, a picture coded by a bidirectional motion estimation and compensation from a previous I- or P-picture and a future I- or P-picture.

B-frame: Same as a B-picture.

Bidirectionally coded picture: Same as a B-picture.

Anchor picture In MPEG, for a P-picture, the I-or P-picture used to predict the P-picture. For a B-picture, either of the adjacent I- or P-pictures, one forward, the other backward in time from the B-picture, used to predict that B-picture backwards and forwards in time, respectively.

Reference pictures: The same as anchor pictures.

Reference frames: The same as anchor pictures.

Variable bit-rate(VBR) encoding: Image coding which the output bit-rate varies over time to account for the different complexities of the original video scenes from time to time. VBR encoding often is associated with encoding to achieve a uniform picture quality.

MPEG stream: In MPEG, a bit-stream typically containing one or more video streams multiplexed with one or more audio streams and other data, such as timing information.

Program stream: A coded stream for a single video program, usually comprising all video, audio, and other data streams associated with that program. An example is an MPEG stream for a program.

Elementary stream: In MPEG, a video stream, audio stream, or private data stream.

Video stream: The bit-stream of coded video information.

Audio stream: The bit-stream of coded audio information.

Packet: In MPEG, the basic unit of an elementary stream. Packets include a packet header and packet data.

Packet header: In MPEG, a header in each packet. The packet header includes a stream identification code and may include one or more time-stamps.

Pack: In MPEG, the basic unit of MPEG streams. Each pack includes a pack header and packets from one or more elementary streams.

Pack header: In MPEG, the header of a pack, possibly including time stamps.

Time-stamps: In MPEG, information in packs or packets which provide means for synchronization during decoding and presentation to the viewer.

Multiplex-wide operators: In MPEG, operations performed in decoding on packs, including the coordination of retrieval off the DSM or channel, the adjustment of clocks, and the management of buffers.

Stream-specific operations: In MPEG, operations performed in decoding on one elementary stream, including demultiplexing and playback synchronization.

DSM: A general term for Digital Storage Medium, used to denote a digital storage or transmission device or system. In the case of encoding, coded data is sent to a DSM or to a data channel, and, in the case of decoding, coded data is obtained from a DSM or from a data channel.

Source clock reference (SCR): In MPEG, data which might be present in a pack header used to adjust local clocks to a master time base.

Decoding time-stamp (DTS): In MPEG, data that may be present in a packet header which indicates the time that the first unit in the packet is to be decoded (audio frame or video picture).

Presentation time-stamp (PTS): In MPEG, data that may be present in a packet header which indicates the time that the first unit (audio frame or video picture) in the packet is to be presented to the viewer.

System Time Clock (STC): A common time base used to create time stamps. The use of a common time base to unify the measurement of the timing of coded data (SCR) and the timing of the presentation of data (the PTS and DTS fields), ensures correct synchronization and buffer management.

System target decoder (STD): In MPEG, a hypothetical model of a decoder used in encoding to create MPEG streams. Real decoders need not be implemented with the same architecture or timing structure as the STD.

Receiver: A device including a decoder. In general, a receiver includes a decoder, tuner, and demodulator.

Reference clock: A local clock in the decoder.

Channel: In the context of the present invention, a particular program stream. The word channel also has other meanings, for example, a communications channel or data channel, which is a digital medium that stores or transports a digital data.

Channel buffer: The buffer of a decoder tuned to a particular program stream.

Block: In the multiplexing method of the present invention, any arbitrary grouping of data corresponding to a fixed time duration of presentation. In MPEG, a macroblock is a block which is the unit of motion compensation and adaptive quantization, thus representing a fixed amount of spatial data. A macroblock in MPEG further comprises one or more luminance blocks and one or more color difference blocks.

Reorder buffer: In MPEG, a buffer used in a video decoder to store I- or P-pictures while the sequence of pictures is reordered before presentation. This is necessitated often in the presence of B-frames.

Stuffing bits: In MPEG, extra stuffing code-bits that are inserted into a compressed bit-stream for the purpose of increasing the bit-rate of the stream. Stuffing bits are discarded during decoding.

Stuffing bytes: Eight stuffing bits.

MPEG Profile: In MPEG-2, the image/picture resolution. The most common profile for broadcast quality is the main profile.

Main Profile (MP): The MPEG-2 profile for CCIR-601 video.

MPEG Level: In MPEG-2, a set of minimum specifications and a subset of MPEG-2 features.

Medium Level (ML): A common MPEG-2 level.

MP@ML: In MPEG-2, MP and ML compliance. An MP@ML compliant decoder has at least 1.8M bits of decoder buffer storage.

B. Digital Video Coding

A video program typically is organized as an ordered sequence of frames, each frame a scene at a particular point in time. It should be noted that the word "frame" is also used in the art of audio-compression and in the MPEG standard to refer to a basic unit of compressed audio. For that reason, the word "picture" is also used herein to indicate a video frame. Each video frame may be thought of as discretized into a two-dimensional array of picture elements (called pixels or pels), and may be split into two or more fields, each field consisting of a subset of the pixels in the picture. Such splitting is called interlacing. In the NTSC (U.S.A and Japan), PAL and SECAM (elsewhere) broadcast television standards, for example, each video frame consists of two fields, and each field consists of the pixels in alternating horizontal lines of the picture.

Each pixel contains information to reproduce the color (hue and saturation) and brightness, and this data may be expressed in various ways. One way is as red, green, and blue ("RGB") values corresponding to the relative amounts of red, green, and blue primaries needed to reproduce the color and brightness. Cathode ray tubes common in television displays have guns that produce red, green, and blue on the screen in response to voltages in the guns. The data can also be expressed at each pixel as intensity data (e.g., luminance) and color data, where the color data is expressed in chrominance coordinates, in hue and saturation coordinates, or some other way. Techniques are known for converting between the various ways of representing pixel information.

The information in each pixel can be represented digitally. Thus, a video program can be converted into a digital data stream which consists of an ordered sequence of bits describing the pixel values in each video frame. Similarly, audio associated with the program can be converted into digital data, and can be identified with the video on a picture-by-picture basis.

It is well known in the art that video data can be compressed. First, the number of bits required to represent each individual pixel may be reduced on a pixel-by-pixel basis. That is, the data of each pixel is processed (reduced) without reference to the data of any other pixel. Second, the number of bits required to represent a field or a picture can be reduced by taking advantage of spatial redundancies in the field or picture. For example, regions of uniform, slowly, or smoothly varying color or brightness may be represented by fewer bits (i.e. less data) than regions of many changes and edges. Third, the number of bits required to represent a sequence of pictures may be reduced by taking advantage of temporal redundancies—areas in the pictures of a sequence that vary slowly or hardly at all in time. The art of image compression also is called image coding. The first method above commonly is called color quantization, the second is called intraframe coding or intra-coding and typically includes color quantization, and the third is called interframe coding or inter-coding and typically, but not necessarily, includes intra-coding.

C. The MPEG Video Coding Standard

The preferred embodiment of the present invention is for video streams which have been compressed in accordance with the MPEG standard. As will be understood to one in the art, the present invention may also be used with video streams that have been compressed using other compression schemes.

The video part of the MPEG standard uses motion compensated predictive coding, the discrete cosine transform (DCT) and adaptive quantization, each of these operating on images on a block-by-block basis. Motion estimation refers to the process of computing the spatial displacement (in the form of motion vectors) from picture to picture, and is usually done by measuring the motion of blocks of pixels from picture to picture. Motion compensation uses the resultant motion vectors to compensate for the motion. MPEG uses both forward motion estimation (in which the estimation is of the future referenced to the past), and backward motion estimation (in which the estimation is of the past referenced to the future). Forward and backward motion estimation are also combined to produce bidirectional motion estimation.

Video frames to be compressed typically consist of an array of luminance pixels, where luminance is denoted by Y, and two arrays of chrominance pixels, where the chrominance signals are denoted by $C_r$ and $C_b$, respectively.

According to the MPEG compression method, video frames (pictures) are classified into one of three types: I-frames, also called I-pictures and intraframe coded pictures; P-frames or P-pictures, also called predictively coded pictures; and B-frames or B-pictures, also called Bidirectionally coded pictures. The three types of video frames differ in their use of motion estimation.

I-pictures use purely spatial compression and are processed independently of other pictures. Thus, I-pictures are processed entirely by intraframe operations and only a moderate level of compression is achieved. On the other hand, a complete picture can be generated from an I-picture alone.

P-pictures and B-pictures also use predictive coding, so can be thought of as dependent pictures.

P-pictures are coded using previous I-pictures or previous P-pictures. The compression of P-pictures relies on temporal prediction from previous I- or P-pictures using motion compensation. Only forward motion estimation/compensation is used in the temporal prediction. The I- or P-picture from which a P-picture is temporally predicted is called the anchor picture to the P-picture. It is also called the reference picture or reference frame.

B-pictures are coded by a bidirectional motion compensated predictive encoder using the next "future" I- or P-picture for backwards prediction and the previous I- or P-picture for forward prediction. The two adjacent I- or P-pictures from which a B-picture is temporally predicted are thus called anchor pictures of the B-picture. The B-picture temporal prediction uses motion compensation in forward and/or backward directions. B-pictures are never used to predict other pictures. Due to the dependence of B-pictures on the two adjacent anchor pictures, B-pictures alone do not contain sufficient data from which to generate a recognizable picture.

In accordance with the MPEG standard, pictures are arranged in ordered groups. The standard allows the encoder to choose the frequency and location of I-pictures. A group of pictures is intended to assist random access into the sequence, thus the first coded picture in a group is normally an I-picture. A typical group then is a series of pictures which might include, as an example, an I-picture as the first picture, P-pictures distributed following every third picture, and a B-picture between every "I and P" and "P and P" sequence. Thus, a typical display order of picture types consistent with this example, might include an I-picture every fifteenth frame, each I-picture followed by two B-pictures, then a sequence of a P-picture followed by two B-pictures, until the next group starts with an I-picture. That is, the display order of I B B P B B P B B P B B P B B I B B P B B P B B . . . A thirty picture-per-second environment which includes an I-picture every fifteenth frame, corresponds to having an independent picture every one half-second.

In accordance with the MPEG standard, after the video signals are digitized, the digital data is organized into macroblocks. A macroblock is the unit of motion compensation and adaptive quantization. A number of macroblocks comprise a picture. Each macroblock defines a predetermined spatial region in a picture, and contains luminance and chrominance information.

The MPEG proposal provides for the arrangement of macroblocks into slices. A slice is an integer number of consecutive macroblocks from a raster of macroblocks. A slice represents the boundary within which differential coding of macroblock parameters, e.g., DC coefficients of a DCT, and motion vectors, is performed. Each slice has its own header information, can be independent of other slices, and each contains at least one macroblock. Slices do not overlap. The position of slices may change from picture to picture. The first slice starts with the first macroblock in the picture and the last slice ends with the last macroblock in the picture. The first macroblock in a slice has its macroblock parameters, e.g., DC coefficients of a DCT (if intraframe coded) and motion vectors, differentially coded from a constant value. Each subsequent macroblock in a slice has its macroblock parameters measured as an offset from the previous macroblock in the slice. Accordingly, the size of the slice is the minimum size for which a piece of data can be recovered and correctly decoded. If part of a slice is lost, it may not be possible to decode the differences in motion vectors or the DC coefficients contained in the remaining part of the slice.

A macroblock comprises four 8×8 luminance blocks ($Y_0$, $Y_1$, $Y_2$, $Y_3$) and two 8×8 color difference blocks ($C_r$ and $C_b$). The four luminance blocks ($Y_0$, $Y_1$, $Y_2$, $Y_3$) and two color difference blocks ($C_r$, $C_b$), which form a single macroblock, are used to encode a 16×16 picture element array covering the same spatial region in a picture. As described above, a macroblock serves as the smallest unit of motion compensation and adaptive quantization.

In accordance with the MPEG standard, motion-compensated predictive coding is carried out by calculating motion vectors for every macroblock in a P-picture or B-picture. MPEG compression usually encodes motion vectors on a macroblock basis, but does not specify the technique for computing them. Thus, a variety of different motion estimation techniques can be implemented consistent with the MPEG standard. One technique, for example, is to compute motion vectors from the picture-to-picture correlation of blocks of pixels in the luminance signal, resulting in a motion vector for the luminance component of the macroblock.

The best mode for encoding each macroblock is selected. Within a given picture, each macroblock is coded in one of several different modes. The intraframe coding mode refers to macroblock coding in which only spatial information is used. Conversely, the interframe coding modes (forward motion, backward motion, and bidirectional motion) refer to macroblock coding in which information from pictures other than the current picture is used in the coding, typically for temporal prediction in motion-compensated predictive coding. For I-picture macroblocks, only intraframe coding mode is available.

In a typical encoder, not specified by the MPEG standard, P-picture macroblocks are first checked to determine if interframe coding without motion compensation is appropriate. This decision is made by computing the luminance energy of a forward prediction residual for the macroblock that results from an interframe coding without motion compensation, and comparing it to a threshold value. If the residual energy is below the threshold, then the macroblock will be coded without motion compensation. Otherwise, the residual macroblock from interframe coding with forward motion compensation will be derived and used to determine if inter-coding or intra-coding is to be used, the last step in the coding mode selection.

B-picture macroblocks are similarly processed to determine whether interframe coding is appropriate. Since B-pictures may be bidirectionally coded, interframe coding can be either forward or backward, based on the preceding and following anchor (i.e., I- or P-) pictures. It may also be based on the average of those macroblocks from the preceding and the following anchor pictures. In interframe coding using motion compensation, there are three possible modes: forward, backward, and bidirectional. The choice of coding mode for B-picture macroblocks may be determined on the basis of luminance prediction residual energy.

The final step in the coding mode selection for both P- and B-picture macroblocks is to choose between interframe coding and intraframe coding. Generally, P-pictures and B-pictures are encoded using interframe encoding. This selection could be made by comparing the luminance energy of the original macroblock to the energy of the luminance interframe (with or without motion compensation) prediction residual macroblock. If the original macroblock has less energy than the prediction residual macroblock, the intraframe coding mode is selected.

After the motion vectors have been calculated, each macroblock is transform encoded. Thus, the macroblocks are transformed from pixel domain to the DCT coefficient domain. The picture information in each picture (i.e., pixel values for I-pictures, and residual error after prediction for B- and P-pictures) is transformed using the DCT and then adaptively quantized. For the purpose of performing the DCT, a picture (a video frame) is divided, for example, into blocks of values (i.e., arrays of DCT coefficients).

The DCT process generates blocks of DCT coefficients in a zigzag-scanned format (i.e., the low-frequency coefficients are followed by the higher frequency coefficients). This zigzag scan arrangement facilitates the subsequent run-length coding process. The DCT coefficient for which the frequency is zero in both dimensions is called the DC coefficient.

Next, adaptive quantization is performed on each block of DCT coefficients. After adaptive quantization has been applied to the DCT coefficients, the coefficients undergo further compression involving such known techniques as differential coding, run-length coding, and variable length coding. As a result, the video compression encoder module produces encoded data in the form of variable length code words, which includes information concerning the selected mode of encoding and any motion vectors needed for decoding. Various headers are also included in the encoded bit-stream which provide information such as the picture size in terms of pixels per line and a pixel aspect ratio. The video compression encoder module also outputs information that states which picture the encoded data represents and which macroblock and slice the encoded data represents.

The code words are then further encoded with other MPEG-1 specific data needed to provide reliable delivery of the variable length encoded compressed video stream.

D. The MPEG Audio Coding Standard

MPEG also includes an audio coding standard. MPEG-1 audio supports mono, stereo, and a dual-mode with two separate channels, useful, for example, for bilingual programs, and a mode called joint stereo, in which inter-channel (left-right) dependencies are also used for bit-rate reduction. In the first stage of MPEG-1 audio compression, an audio signal is converted into spectral subband components, then each subband is quantized. Psychoacoustic models can be used in the encoding process. MPEG-2 adds multichannel support as dual standards: MPEG-1 backwards-compatible coding and nonbackwards-compatible coding.

MPEG audio bit-streams are broken down into units called frames. An MPEG-1 audio stream consists of variable length frames, each frame starting with an MPEG-1 header, followed by the MPEG-1 audio signal, then followed by a variable-length field, which is reserved for ancillary data and ignored by MPEG-1 decoders.

The word "frame" in this context is not to be confused with a video frame. For that reason, the word "picture" also is used herein to indicate a video frame.

A backwards compatible MPEG-2 audio stream has frames which include the necessary MPEG-2 multichannel extension signals in the fields of MPEG-1 frames for ancillary data.

This invention deals with complete MPEG streams including both video and audio. Details are provided herein only for dealing with the video stream, because, it is the determining or limiting part, for example, processing the audio to be consistent with the method of the present invention would be straightforward to one in the art.

E. Audio/Video Synchronization and MPEG Receivers

A complete MPEG stream consists of the MPEG video stream, the MPEG audio stream, and other data, such as timing information, all combined and multiplexed together to form a single stream suitable for digital transmission or storage. The MPEG standard imposes syntactical and semantic rules to enable synchronized playback. The standard does not specify the exact architecture or implementation of encoders or decoders, but does specify bit-stream properties and performance requirements that need to be met, such as minimum clock tolerances.

The term program stream is used herein to indicate a coded stream, such as an MPEG stream, for a single program, including the video and audio. Thus, a program stream may consist of the MPEG stream of a digitized motion picture, a digitized terrestrial, cable or satellite television program, or different time segments of the same motion picture or television program.

The video stream, audio stream, etc. are called elementary streams. An MPEG stream thus consists of one or more elementary streams multiplexed together. Data from each elementary stream is stored in units called packets, which typically are serialized in that stream. A packet consists of a packet header followed by packet data. The packet header begins with a start-code, and also identifies the stream to which the packet data belongs. The packet header may also include one or more time-stamps to indicate the timing of the event represented by the packet data. The packet data contains a variable number of contiguous bytes from one elementary stream, e.g., audio, video, or other data.

Packets are organized together into packs. Packs may contain packets from more than one elementary stream, for example, from both the audio and the video stream, and so are used for multiplex-wide operations in decoding. This is in contrast to operations on packet data, called stream-specific operations which reflect the fact that the data in a packet is from one specific elementary stream. A pack commences with a pack header, and may be followed by one or more packets. The pack header may include a time-stamp called the source clock reference (SCR), which specifies the exact time at which the SCR data byte (and thus each other byte) is to enter the decoder from the digital storage medium (the DSM) or the data channel. This target arrival schedule serves as a reference for clock correction and/or for managing buffers in the decoder. The first pack in any stream also may convey information on the maximum data rate and the number of channels in the multiplex.

Thus, multiplex-wide operations performed on packs include the coordination of data retrieval off the DSM or channel, the adjustment of clocks, and the management of buffers.

The two principal stream-specific operations are demultiplexing and synchronizing the playback of multiple elementary streams. Demultiplexing reconstitutes elementary streams from the multiplexed streams using the stream identification codes contained in packet headers. Elementary streams in addition to audio and video streams may include private, reserved, and padding streams.

Synchronization among multiple streams is effected with time-stamps which may be present in packet headers. Presentation time-stamps (PTS) and decoding time-stamp (DTS) fields are used in packet headers for synchronization of audio and video. The PTS is the time at which the first unit (audio frame or video picture) in the packet data is to be presented to the viewer, and the DTS is the time that the first unit (audio frame or video picture) in the packet data is to be decoded. All time-stamps, including those in pack headers, are adjusted during encoding to a master time base called the system time-clock (STC). The use of a common time base to unify the measurement of the timing of coded data (SCR in the pack header), and the timing of the presentation of data (the PTS and DTS fields in packet headers) ensures correct synchronization and buffer management. SCR, PTS, and, if used, DTS fields are inserted during encoding at internals not necessarily equal, but not to exceed some specified value—0.7 seconds in MPEG-1. Also, in MPEG-1, these time stamps are in units of 90 kHz.

A decoding system, including all of the synchronized decoders and the source of the coded data, must have exactly one independent time-master. This fact is a natural result of the requirement to avoid overflow and underflow in finite size buffers, while maintaining synchronization of the presentation of data. All other synchronized entities must slave the timing of their operation to the time-master. If a decoder attempts to have more than one simultaneous time-master it may experience problems with buffer management or synchronization. Thus, playback of several streams is synchronized by adjusting the playback of all streams to a single master time base rather than by adjusting the playback of one stream to match that of another. The master time base may be one of the individual stream's decoders' clocks, for example, the video decoder or the audio decoder, it may be the DSM or channel clock, or it may be a separate STC such as some external clock. The time-master must communicate to the others the correct value of the STC. A time slave will typically maintain a local STC which is incremented nominally at 90 kHz (for MPEG-1) between updates or corrections. In this way, each entity has a continuously updated value of the STC which is nominally correct and which it uses to compare with the time-stamps.

The MPEG stream properties and semantics defined above are set out in the MPEG standard using a hypothetical reference model of decoding in the form of a hypothetical decoder called the system target decoder (STD). The STD model is used by encoders to create MPEG streams, but real decoders need not be implemented with the same architecture or timing structure as the STD.

The STD model consists of a demultiplexer followed by, for each elementary stream, a first-in first-out (FIFO) buffer followed by a decoder. In the model, data present in headers of the packs or packets, but not part of packet data (e.g., SCR, DTS, PTS, packet lengths, etc.) is not delivered to any of the stream buffers, but may be used to control the system. In one preferred embodiment of the present invention, such data is used to optimize the efficiency of transmitting VBR data.

In the STD model, the data output of the buffer is decoded instantaneously, and may be delayed in a reorder buffer before being presented to the viewer at the output of the STD. Reorder buffers are used only for video decoding in order to store I-pictures and P-pictures, while the sequence of presentation pictures is reordered before presentation. This is often necessitated in the presence of B-frames.

As an example, consider a decoder for a video stream which includes an internal clock. The buffer at any time includes packets of the stream. The output of the buffer is connected to the decoder. The decoder needs to know when to decode the next packet. If a packet header has a DTS, then the decoder takes that packet when the DTS is less than or equal to the decoder clock. If a packet does not contain a DTS, then the decoder takes that packet at the next time instant that the decoder expects a packet, based on previous packets decoded.

Thus, MPEG streams containing elementary streams are formed (video and/or audio) and multiplexed together.

F. MPEG-2 Profiles and Levels

The MPEG-2 Standard defines classes of image resolution and sound quality (the "profile") and a minimum subset of specifications and features of the MPEG standard (the "level"). For example, main profile ("MP") covers the common CCIR-601 standards of a resolution of 704 pixels per line for 525 line/60 Hz systems (NTSC) and 625 line/50 Hz systems (PAL and SECAM). Low profile ("LP") covers the SIF resolution which is half of CCIR-601 and is commonly used in video conferencing, while high profile ("HR") is usually reserved for high definition television (HDTV). There are three levels, low level (LL), medium level (ML), and high level (HL). A decoder meeting MPEG-2 compliance specifications must meet these minimum specifications and offer at least the subset of MPEG-2 features of that level. For example, the most common decoder is the MP@ML compliant decoder. It must have a decoder buffer that is at least 1.8M bits in size. An MP@HL compliant decoder must have a larger decoder buffer and must be able to implement many of the scaleable features of MPEG-2.

What is claimed is:

1. A method for reducing the size of data rate fluctuations that occur in forming a multiplex of a set of program streams, each program stream in said set being decodeable by a corresponding decoder, each corresponding decoder including a corresponding decoder buffer, said decoder buffers having a maximum allowable size, said method comprising varying the formation of the different program streams in said set in order to insure that all program streams comprising the multiplex are decodeable while each decoder buffer maintains a level below its maximum allowable size;

wherein said program streams are segments of a program and said varying varies the segment length of said segments until an optimal segment length is determined; and wherein said optimal length is the shortest segment length that will produce peaks in a memory requirement less than the maximum allowable size of said decoder buffers.

2. The method of claim 1, wherein said segments are divided into packets, and wherein said varying comprises repeating until said optimal segment length is determined, the steps of:

(a) selecting a segment length; and (b) repeating for all packets the steps of (i) using a multiplexing method, said multiplexing method including determining the segment corresponding to said next packet;

(ii) determining for the segment corresponding to said next packet a decoder buffer size requirement; and (iii) ascertaining whether said decoder buffer size requirement is less than the maximum allowable size.

3. The method of claim 2, wherein said step of determining said decoder buffer size requirement includes the step of determining the minimum and maximum occupancy levels of the decoder buffer corresponding to the segment corresponding to said next packet, said occupancy level determining step including using one or more time stamps in the segment corresponding to said next packet.

4. A method for reducing the size of data rate fluctuations that occur in forming a multiplex of a set of program streams, each program stream in said set being decodeable by a corresponding decoder, each corresponding decoder including a corresponding decoder buffer, said decoder buffers having a maximum allowable size, said method comprising varying the formation of the different program streams in said set in order to insure that all program streams comprising the multiplex are decodeable while each decoder buffer maintains a level below its maximum allowable size;

said varying including the step of selectively inserting material at selected points in time in selected program streams in said set; and wherein said selected points in time are selected scene changes and wherein material is one or more repetitions of a picture following said selected scene change.

5. An apparatus for reducing the size of data rate fluctuations occurring in the formation of a multiplex of a set of program streams, each program stream in said set being decodeable by a corresponding decoder, each corresponding decoder including a corresponding decoder buffer, said decoder buffers having a maximum allowable size, said apparatus including means for detecting the size of data rate fluctuations, and means coupled to said detecting means for manipulating the different program streams to insure that all program streams comprising the multiplex are decodeable and that each decoder buffer maintains a level below its maximum allowable size;

wherein said program streams are segments of a program, said apparatus further comprising means for multiplexing, multiplexing including varying the segment length of said segments until an optimal segment length is determined, said optimal length being the shortest segment length that will insure that all program streams comprising the multiplex are decodeable and that each decoder buffer maintains a level below its maximum allowable size.

6. The apparatus of claim 5, wherein said multiplexing means includes a means for determining next packet to send and the segment corresponding to said next packet.

7. The apparatus of claim 6, further comprising a means for determining decoder buffer size requirement for said segment and ascertaining whether said decoder buffer size requirement is less than the maximum allowable size.

8. The apparatus of claim 7, wherein said means for determining and ascertaining decoder buffer size requirement includes:

(a) a means for reading the time stamps of the program streams; and (b) a means, coupled to said reading means, for determining the minimum and maximum occupancy levels of the decoder buffer corresponding to the segment that contains said next packet.

* * * * *